United States Patent
Peng et al.

(10) Patent No.: US 12,137,290 B2
(45) Date of Patent: Nov. 5, 2024

(54) FACE IMAGE AND IRIS IMAGE ACQUISITION METHOD AND DEVICE, READABLE STORAGE MEDIUM, AND APPARATUS

(71) Applicants: EYECOOL TECHNOLOGY CO., LTD., Hebei (CN); EYECOOL SHENZHEN TECHNOLOGY CO., LTD., Shenzhen (CN); EYECOOL TECHNOLOGY CO., LTD., Beijing (CN)

(72) Inventors: Cheng Peng, Hebei (CN); Jun Zhou, Hebei (CN)

(73) Assignees: EYECOOL TECHNOLOGY CO., LTD., Hebein (CN); EYECOOL TECHNOLOGY CO., LTD., Beijing (CN); EYECOOL SHENZHEN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/938,128

(22) Filed: Oct. 5, 2022

(65) Prior Publication Data

US 2023/0024829 A1    Jan. 26, 2023

Related U.S. Application Data

(63) Continuation of application No. PCT/CN2021/085999, filed on Apr. 8, 2021.

(30) Foreign Application Priority Data

Apr. 10, 2020    (CN) .......................... 202010277148.5

(51) Int. Cl.
H04N 23/71    (2023.01)
G06T 7/73    (2017.01)
(Continued)

(52) U.S. Cl.
CPC .............. *H04N 23/71* (2023.01); *G06T 7/73* (2017.01); *G06V 10/143* (2022.01);
(Continued)

(58) Field of Classification Search
CPC ...... H04N 23/71; H04N 23/74; H04N 23/695; G06T 7/73; G06T 2207/10152
See application file for complete search history.

(56) References Cited

U.S. PATENT DOCUMENTS 6,714,665 B1 *    3/2004    Hanna .................... G06F 18/00
                                                         382/209
8,408,706 B2 *    4/2013    Yahav .................. H04N 13/239
                                                         351/209
(Continued)

FOREIGN PATENT DOCUMENTS

CN    101650774 A    2/2010
CN    102708357 A    10/2012
(Continued)

OTHER PUBLICATIONS

Bohme, M.; Meyer, A.; Martinetz, T.; Barth, E. Remote Eye Tracking: State of the Art and Directions for Future Development. In Proceedings of the 2nd Conference on Communication by Gaze Interaction—COGAIN, Turin, Italy, Sep. 4-5, 2006. (Year: 2006).*

(Continued)

*Primary Examiner* — Michael Robert Cammarata
(74) *Attorney, Agent, or Firm* — Dorsey & Whitney LLP

(57) ABSTRACT

Disclosed are a face image and iris image acquisition method and device, a computer-readable readable storage medium and an apparatus. The method includes rotating the first tripod head to force the face lens and the iris lens to be in acquisition positions; capturing a first face image and a first iris image simultaneously by the face lens and the iris lens; and locating the iris in the first iris image, and if no iris (Continued)

is located, determining whether a condition of light-avoiding rotation is satisfied, and if the condition is satisfied, rotating the second tripod head to adjust an angle or a position of the supplementary light source to enable a light spot region to avoid an iris region.

20 Claims, 10 Drawing Sheets

(51) Int. Cl.
*G06V 10/143* (2022.01)
*G06V 10/145* (2022.01)
*G06V 10/60* (2022.01)
*G06V 10/98* (2022.01)
*G06V 40/16* (2022.01)
*G06V 40/19* (2022.01)
*H04N 23/74* (2023.01)

(52) U.S. Cl.
CPC ............ *G06V 10/145* (2022.01); *G06V 10/60* (2022.01); *G06V 10/993* (2022.01); *G06V 40/166* (2022.01); *G06V 40/171* (2022.01); *G06V 40/19* (2022.01); *H04N 23/74* (2023.01); *G06T 2207/10048* (2013.01); *G06T 2207/10152* (2013.01); *G06T 2207/30168* (2013.01); *G06T 2207/30201* (2013.01); *G06T 2207/30244* (2013.01)

(56) References Cited

U.S. PATENT DOCUMENTS

| | | | | |
|---|---|---|---|---|
| 8,433,103 | B2* | 4/2013 | Friedman | G06V 40/19 382/116 |
| 8,878,749 | B1* | 11/2014 | Wu | G09G 5/00 351/209 |
| 8,965,063 | B2* | 2/2015 | Hanna | G06V 40/197 382/116 |
| 9,916,502 | B2* | 3/2018 | Agrawal | H04N 23/11 |
| 10,902,104 | B2* | 1/2021 | Mapen | G06F 21/40 |
| 2003/0020828 | A1* | 1/2003 | Ooi | G06V 40/18 348/370 |
| 2003/0108224 | A1* | 6/2003 | Ike | G06V 40/19 382/117 |
| 2003/0118217 | A1* | 6/2003 | Kondo | G06V 40/19 382/209 |
| 2008/0069411 | A1* | 3/2008 | Friedman | G06V 40/19 382/118 |
| 2011/0298912 | A1 | 12/2011 | Jelinek et al. | |
| 2012/0002028 | A1* | 1/2012 | Takahashi | G06V 40/19 348/78 |
| 2016/0166140 | A1* | 6/2016 | Lawrenson | A61B 3/0041 351/208 |
| 2016/0358009 | A1* | 12/2016 | Agrawal | H04N 5/33 |
| 2017/0017842 | A1 | 1/2017 | Ma et al. | |
| 2019/0087657 | A1* | 3/2019 | Wang | G06T 7/11 |
| 2021/0042401 | A1* | 2/2021 | Nagai | G06T 7/521 |
| 2023/0356728 | A1* | 11/2023 | Jain | G06V 10/141 |

FOREIGN PATENT DOCUMENTS

| | | | | |
|---|---|---|---|---|
| CN | 103077386 | A | | 5/2013 |
| CN | 204087228 | U | | 1/2015 |
| CN | 104992163 | A | | 10/2015 |
| CN | 204943208 | U | | 1/2016 |
| CN | 207037685 | U | | 2/2018 |
| CN | 208314882 | U | * | 1/2019 |
| CN | 109451233 | A | | 3/2019 |
| CN | 109743488 | A | | 5/2019 |
| CN | 109753925 | A | | 5/2019 |
| CN | 111200709 | A | * | 5/2020 ............ B60K 35/00 |
| WO | 2017206932 | A1 | | 12/2017 |

OTHER PUBLICATIONS

Gwon SY, Cho CW, Lee HC, Lee WO, Park KR. Gaze tracking system for user wearing glasses. Sensors (Basel). Jan. 27, 2014;14(2):2110-34. doi: 10.3390/s140202110. PMID: 24473283; PMCID: PMC3958289. (Year: 2014).*
P. Doynov and R. Derakhshani, "A standoff system for noncooperative ocular biometrics," 2012 IEEE Conference on Technologies for Homeland Security (HST), Waltham, MA, USA, 2012, pp. 144-149, doi: 10.1109/THS.2012.6459840. (Year: 2012).*
W. Dong, Z. Sun, and T. Tan, "A Design of Iris Recognition System at a Distance". Chinese Conference on Pattern Recognition (CCPR 2009), Nov. 1-5, 2009. (Year: 2009).*
F. Bashir, D. Usher, P. Casaverde and M. Friedman, "Video Surveillance for Biometrics: Long-Range Multi-biometric System," 2008 IEEE Fifth International Conference on Advanced Video and Signal Based Surveillance, Santa Fe, NM, USA, 2008, pp. 175-182, doi: 10.1109/AVSS.2008.28. (Year: 2008).*
F. W. Wheeler, A. G. A. Perera, G. Abramovich, B. Yu and P. H. Tu, "Stand-off Iris Recognition System," 2008 IEEE Second International Conference on Biometrics: Theory, Applications and Systems, Washington, DC, USA, 2008, pp. 1-7, doi: 10.1109/BTAS.2008.4699381. (Year: 2008).*
Lee JM, Lee HC, Gwon SY, Jung D, Pan W, Cho CW, Park KR, Kim HC, Cha J. A new gaze estimation method considering external light. Sensors (Basel). Mar. 11, 2015;15(3):5935-81. doi: 10.3390/s150305935. PMID: 25769050; PMCID: PMC4435212. (Year: 2015).*
International Search Report and Written Opinion from International Application No. PCT/CN2021/085999 mailed Jun. 25, 2021.
Extended European Search Report for European Application No. 21785684.8 mailed Mar. 4, 2024.

* cited by examiner

A horizontal rotation angle and a vertical rotation angle are calculated according to a pixel difference between horizontal and vertical coordinates of an eye position and preset reference horizontal and vertical coordinates — S1201

A vertical rotation angle or a horizontal rotation angle is calculated according to a pixel difference between a vertical coordinate or a horizontal coordinate of an eye position and a preset reference horizontal or vertical coordinate — 1202

FACE IMAGE AND IRIS IMAGE ACQUISITION METHOD AND DEVICE, READABLE STORAGE MEDIUM, AND APPARATUS

CROSS REFERENCE TO RELATED APPLICATION

The present application is a continuation application of International Application PCT/CN2021/085999, filed on Apr. 8, 2021, which claims the priority of the Chinese patent application No. 202010277148.5, entitled "FACE IMAGE AND IRIS IMAGE ACQUISITION METHOD AND DEVICE, READABLE STORAGE MEDIUM, AND APPARATUS", and filed with the China Patent Office on Apr. 10, 2020, the contents of which are expressly incorporated herein by reference in their entirety.

TECHNICAL FIELD

The present disclosure relates to the field of biometric identification, and particularly to a face image and iris image acquisition method and device, a readable storage medium, and an apparatus.

BACKGROUND

The technology of biometric identification is a close combination of a computer and high-tech means such as optics, acoustics, and biosensors and biostatistics principles, and is used for personal identification by means of the inherent physiological characteristics (such as fingerprints, faces, iris, etc.) and behavioral characteristics (such as handwriting, voice, gait, etc.) of the human body.

As an important identification feature, the iris has the advantages of lifetime uniqueness, stability, acquirability, and non-invasiveness, and is an inevitable trend in the development of identification research and application thereof.

The iris is hidden deep in the eyes. During the acquisition of iris information, quite a number of people wear glasses, and there is a certain probability that the glasses will reflect light and block the iris. Moreover, the changes in the natural light outside may also cause light spots, which may cause difficulties in acquiring the iris information. It may even be impossible to acquire clear and effective iris information due to the influence of the light spots, so that an identification based on the iris information may not be performed.

Therefore, the current iris information acquisition method has the problem that clear and effective iris information may not be acquired due to the influence of the light spot.

SUMMARY

In order to solve the technical problems above, the present disclosure provides a face image and iris image acquisition method and a device, a readable storage medium, and an apparatus. The present disclosure utilizes the overlapped region captured by a face lens and an iris lens and light spot data to solve a problem of iris positioning failure caused by an interference of a large light spot, thereby acquiring clear and usable iris images.

The present disclosure provides following technical solutions.

In a first aspect, the present disclosure provides a face image and iris image acquisition method, a face lens and an iris lens are installed on a first tripod head, a supplementary light source is installed on a second tripod head, and the method includes: rotating the first tripod head to force the face lens and the iris lens to be in acquisition positions, capturing a first face image and a first iris image simultaneously by the face lens and the iris lens, and locating the iris in the first iris image, and if no iris is located, determining whether a condition of light-avoiding rotation is satisfied, and if the condition is satisfied, rotating the second tripod head to adjust an angle or a position of the supplementary light source to enable a light spot region to avoid an iris region.

The determining whether the condition of light-avoiding rotation is satisfied includes: locating the light spot region in the first iris image, and calculating an area of the light spot region, locating facial features including an eye in the first face image, and locating the facial features in the first iris image, determining whether the light spot region covers the iris region according to positions of the facial features of the same part in the first face image and in the first iris image, a position of the eye in the first face image, and a position of the light spot region in the first iris image, and determining that the condition of light-avoiding rotation is satisfied, if the area of the light spot region satisfies a set threshold condition and the light spot region covers the iris region.

In some embodiments, the rotating the first tripod head to force the face lens and the iris lens to be in the acquisition positions includes: capturing a second face image by the face lens, locating an eye in the second face image, and calculating a first angle by which the first tripod head needs to be rotated according to located position coordinates of the eye and preset first reference coordinates, controlling the first tripod head to rotate according to the first angle, and during a rotation of the first tripod head, capturing a second iris image in real time by the iris lens, and locating the iris, calculating a second angle by which the first tripod head needs to be rotated according to located position coordinates of the iris and preset second reference coordinates if the iris is located in the second iris image captured in real time, and controlling the first tripod head to rotate according to the second angle.

In some embodiments, the capturing the first face image and the first iris image simultaneously by the face lens and the iris lens, and the locating the iris in the first iris image, and if no iris is located, determining whether the condition of light-avoiding rotation is satisfied, include: capturing the first face image and the first iris image simultaneously through the face lens and the iris lens after the first tripod head completes rotating, locating the iris in the first iris image, and determining whether the condition of light-avoiding rotation is satisfied, if no iris is located in the second iris image and in the first iris image.

In some embodiments, the method further includes: determining whether quality of the first iris image meets requirements if the iris in the first iris image is located, and if the quality of the first iris image does not meet the requirements, rotating the second tripod head to adjust an angle or a position of the supplementary light source.

In some embodiments, the method further includes: capturing a third iris image in real time through the iris lens during a rotation of the second tripod head, locating the light spot region and the iris in real time in the third iris image, and if the iris in the third iris image is located and the light spot region does not cover the iris region, controlling the second tripod head to pause to wait for the iris lens to capture images.

In some embodiments, the supplementary light source includes a plurality of near-infrared light supplement lights.

The plurality of near-infrared light supplement lights are distributed at different positions around the iris lens. The plurality of near-infrared light supplement lights have various wavelengths; and when the supplementary light source supplements light, the near-infrared light supplement lights at different positions lighten alternately, and wavelengths of the near-infrared light supplement lights that lighten simultaneously each time are the same.

In some embodiments, the locating the light spot region in the first iris image, and the calculating the area of the light spot region, include: making statistics for gray values of pixels in the first iris image, and if the gray values of several continuous pixels exceed a set value, determining a region composed of the several continuous pixels to be the light spot region, and making statistics for pixel numbers n and n' in horizontal and vertical directions of the light spot region, respectively, and calculating the area S of the light spot region by an equation: $S=(2*n*x*\tan(\theta/2)/m)^2*n'/n$, m denotes a horizontal pixel number of the first iris image, $\theta$ denotes a field angle of the iris lens, and x denotes a capturing distance between the iris lens and a user.

In some embodiments, after locating the facial features including the eye in the first face image and locating the facial features in the first iris image, the method further includes: rotating the first tripod head according to a position in the first face image of a located facial feature in the first face image and/or a position in the first iris image of a located facial feature in the first iris image.

In some embodiments, the determining whether the light spot region covers the iris region according to the positions of the facial features of the same part in the first face image and in the first iris image, the position of the eye in the first face image, and the position of the light spot region in the first iris image, includes: determining positions of feature points of the same parts among located feature information points of facial features in the first face image and located feature information points of facial features in the first iris image, obtaining a position of the eye in the first iris image according to the positions of the feature points of the same parts and the position of the eye in the first face image, and determining whether the light spot region covers the iris region according to the position of the eye in the first iris image and the located position of the light spot in the first iris image.

In some embodiments, the determining whether the light spot region covers the iris region according to the position of the eye in the first iris image and the located position of the light spot in the first iris image, includes: determining whether the position of the eye in the first iris image overlaps with the position of the located light spot region in the first iris image; if yes, determining that the light spot region covers the iris region; and if not, determining that the light spot region does not cover the iris region.

In a second aspect, the present disclosure provides a face image and iris image acquisition device, a face lens and an iris lens are installed on a first tripod head, a supplementary light source is installed on a second tripod head, and the device includes: a first rotation module, a first capturing module, and a first locating module.

The first rotation module is configured to rotate the first tripod head to force the face lens and the iris lens to be in acquisition positions.

The first capturing module is configured to capture a first face image and a first iris image simultaneously by the face lens and the iris lens.

The first locating module is configured to locate the iris in the first iris image, and to determine whether a condition of light-avoiding rotation is satisfied if no iris is located, and to rotate the second tripod head to adjust an angle or a position of the supplementary light source to enable a light spot region to avoid an iris region if the condition is satisfied.

Determining whether the condition of light-avoiding rotation is satisfied is performed by a second locating module, a third locating module, a first determination module, and a second determination module.

The second locating module is configured to locate the light spot region in the first iris image, and calculate an area of the light spot region.

The third locating module is configured to locate facial features including an eye in the first face image, and locating the facial features in the first iris image.

The first determination module is configured to determine whether the light spot region covers the iris region according to positions of the facial features of the same part in the first face image and in the first iris image, a position of the eye in the first face image, and a position of the light spot region in the first iris image.

The second determination module is configured to determine that the condition of light-avoiding rotation is satisfied, if the area of the light spot region satisfies a set threshold condition and the light spot region covers the iris region.

In some embodiments, the first rotation module includes following units.

A first capturing unit is configured to capture a second face image by the face lens.

A first locating unit is configured to locate an eye in the second face image, and calculate the first angle by which the first tripod head needs to be rotated according to the located position coordinates of the eye and the preset first reference coordinates.

A first rotation unit is configured to control the first tripod head to rotate according to the first angle, and during the rotation of the first tripod head, capture the second iris image in real time by the iris lens and locate the iris in real time in the second iris image.

A second rotation unit is configured to, if the iris is located in the second iris image captured in real time, calculate the second angle by which the first tripod head needs to be rotated according to the located position coordinates of the iris and the preset second reference coordinates, and control the first tripod head to rotate according to the second angle.

In some embodiments, the first capturing module and the first locating module include following units.

A second capturing unit is configured to, after the first tripod head completes rotating, capture the first face image and the first iris image simultaneously through the face lens and the iris lens.

A second locating unit is configured to locate the iris in the first iris image.

A determining unit is configured to, if the iris is neither located in the second iris image, nor located in the first iris image, determine whether the condition of light-avoiding rotation is satisfied.

In some embodiments, if the iris in the first iris image is located, it is determined whether the quality of the first iris image meets the requirements, if not, the second tripod head is rotated to adjust the angle or the position of the supplementary light source.

In some embodiments, during the rotation of the second tripod head, a third iris image is captured in real time through the iris lens.

The light spot region and the iris are located in real time in the third iris image. If the iris in the third iris image is located and the light spot region does not cover the iris region, the second tripod head is controlled to pause to wait for the iris lens to capture images.

In some embodiments, the supplementary light source includes a plurality of near-infrared light supplement lights. The plurality of near-infrared light supplement lights are distributed at different positions around the iris lens. The plurality of near-infrared light supplement lights have various wavelengths. When the supplementary light source supplements light, the near-infrared light supplement lights at different positions lighten alternately, and the wavelengths of the near-infrared light supplement lights that lighten simultaneously each time are the same.

In some embodiments, the second locating module includes following units.

The determination unit for light spot region is configured to make statistics for the gray values of pixels in the first iris image, and if the gray values of several continuous pixels exceed the set value, determine that a region composed of the several continuous pixels is the light spot region.

The area calculation unit is configured to make statistics for pixel numbers n and n' in the horizontal and vertical directions of the light spot region, and calculate an area S of the light spot region by an equation:

$$S=(2*n*x*\tan(\theta/2)/m)^2 *n'/n$$

Where, m denotes the horizontal pixel number of the first iris image, θ denotes the field angle of the iris lens, and x denotes a capturing distance between the iris lens and the user.

The device further includes a correction unit.

The correction unit is configured to rotate the first tripod head according to a position in the first face image of the located facial feature in the first face image and/or a position in the first iris image of the located facial feature in the first iris image.

In a third aspect, the present disclosure provides a non-transitory computer-readable storage medium for face image and iris image acquisition, including a memory for storing processor-executable instructions, and the processor, when executing the instructions, performs steps of the face image and the iris image acquisition method of the first aspect.

In a fourth aspect, the present disclosure provides a face image and iris image acquisition apparatus, including at least one processor and a memory for storing computer-executable instructions, and the processor, when executing the instructions, performs steps of the face image and the iris image acquisition method of the first aspect.

The present disclosure has the following beneficial effects.

The present disclosure uses the feature points of the same part in the overlapped region of the first face image and the first iris image, and the light spot data, thereby avoiding the problem of an iris locating failure caused by the interference of the large light spot. The light spot accurately can avoid the iris region by adjusting the angle of the supplementary light source when the light spot blocks the iris region, thereby acquiring a clear and usable iris image.

DESCRIPTION OF THE EMBODIMENTS

Figure 1:
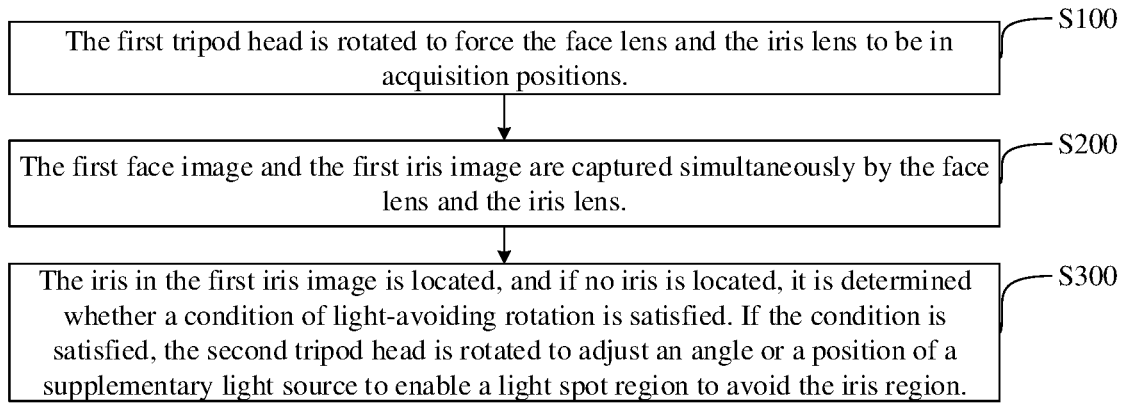
FIG. 1 is a flow chart of a face image and iris image acquisition method of the present disclosure.

In order to make the technical problems, technical solution, and advantages of the present disclosure clearer, the technical solutions of the present disclosure will be clearly and completely described below with reference to the accompanying drawings and specific embodiments. Obviously, the described embodiments are only some but not all embodiments of the present disclosure. The components in the embodiments of the present disclosure described and illustrated in the drawings herein may generally be arranged and designed by means of various configurations. Thus, the detailed description of the embodiments of the present disclosure provided in the accompanying drawings is not intended to limit the scope of the disclosure as claimed, but is merely representative of selected embodiments of the present disclosure. Based on the embodiments of the present disclosure, all other embodiments obtained by those skilled in the art without creative work fall within the protection scope of the present disclosure.

First Embodiment

The embodiment of the present disclosure provides a face image and iris image acquisition method. The present disclosure is applicable to a device having two sets of imaging modules including a face lens and an iris lens. The device may be a smart door lock, or an all-in-one machine for face and iris identification, or an access control setting, or any other device with both the face lens and the iris lens.

Figure 7:
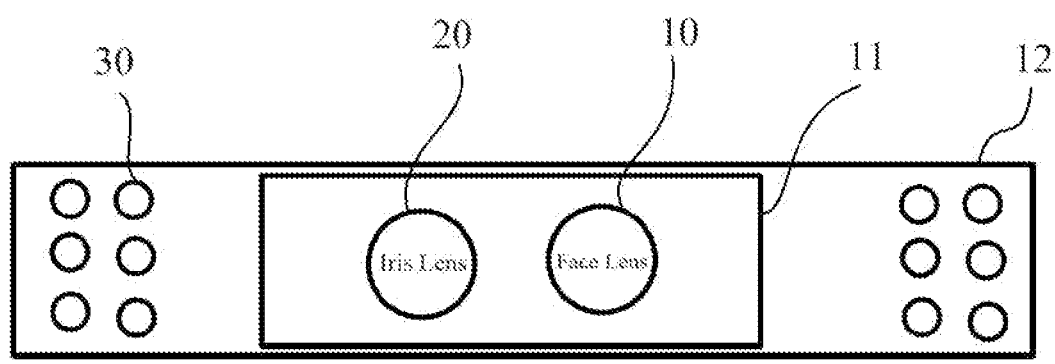
FIG. 7 is schematic view showing an application environment of the face image and iris image acquisition method of the present disclosure.

FIG. 7 is schematic view showing an application environment of the face image and iris image acquisition method of the present disclosure, as shown in FIG. 7, both the face lens 10 and the iris lens 20 are installed on a first tripod head 11, and the face lens 10 and the iris lens 20 may be located on the same horizontal line (in a direction parallel to a rotation axis of the first tripod head 11) of a device housing. There is a relatively small horizontal distance between the face lens 10 and the iris lens 20, and the distance is in a range of 40 mm, for example. A field angle of the face lens 10 is relatively large, and a field angle of the iris lens 20 is relatively small. The face lens 10 and the iris lens 20 may rotate along with the rotation of the first tripod head 11. A supplementary light source 30 is installed on the second tripod head 12.

The first tripod head and the second tripod head may rotate up and down and/or left and right. The specific structure of the tripod head is not limited in the present disclosure, and may be, for example, an electric two-dimensional tripod head (rotatable up and down, and left and right) controlled by a stepper motor, or a simple rotating shaft (rotatable only in one up-and-down, or left-and-right dimension), and the rotating shaft is controlled by a stepper motor.

As shown in FIG. 1, the method includes following steps.

At step S100, the first tripod head is rotated to force the face lens and the iris lens to be in acquisition positions.

The face lens and the iris lens are in the acquisition positions, which means that when the first tripod head rotates to a certain position, the face lens and the iris lens may capture a face image and an iris image at the same time, and the face is roughly in the center of the face image, and the iris is roughly in the center of the iris image.

The first tripod head may be driven by a motor. In some embodiments, the acquisition position may be a fixed position, and suitable for capturing a user with a height of a fixed range. For example, the device is an iris lock. The iris lock is suitable for a family, and is usually used by several fixed users, therefore, the acquisition position may be one corresponding to an average height of all users of the family, thereby reducing a rotation angle of the first tripod head and speeding up a capturing speed of the face image and the iris image. In other embodiments, the acquisition position may also change according to the user's height, which is suitable for capturing users of different heights. For example, the device is an access control device, which is generally arranged at an entrance of an enterprise, and the acquisition position of the face lens and the iris lens may be adaptively adjusted according to the user's height, which are not limited in the present disclosure.

An example of the angle of the first tripod head may be implemented as follows.

Firstly, reference coordinates are preset, and the iris image may be captured at the reference coordinates, and the eye position is in the center of the iris image. Then the position coordinates of the eye in the captured face image or iris image are located, and are converted into an angle that the stepper motor needs to rotate according to a pixel difference between the position coordinates of the eye and the reference coordinates. Then, a rotation command is sent to the motor, and the motor rotates for a corresponding angle according to the received command.

At step S200, a first face image and a first iris image are captured simultaneously by the face lens and the iris lens.

During the rotation of the first tripod head, the face image and the iris image may be captured in real time, and the rotation angle of the first tripod head may be corrected according to the face image and the iris image captured in real time, and of course, may not be corrected.

After the rotation of the first tripod head is completed, the face lens and the iris lens arrive at the respective acquisition position, and capture and obtain the first face image and the first iris image at the same time. The first face image and the first iris image may be used for a subsequent face and iris identification authentication, and for a face and iris liveness detection, etc.

At step S300, the iris in the first iris image is located, and if no iris is located, it is determined whether a condition of light-avoiding rotation is satisfied. If the condition is satisfied, the second tripod head is rotated to adjust an angle or a position of the supplementary light source to enable a light spot region to avoid the iris region.

In the prior art, in order to make the light spot avoid the iris region, the positions of the light spot and the iris in the captured iris image are located, and the position of the supplementary light source is adjusted according to the light spot location information and the iris location information, so that the light spot moves out of the iris region.

However, during an application in a real scene, in order to adapt to more application environments, a supplementary light source with a large area is often needed to supply light. In this case, the reflected light spot will also increase, and when the ambient light in the real scene is not ideal (for example, the light is too strong), the light spot with the large area will also appear. This light spot with the large area sometimes even covers the entire iris region completely, thus disenabling the iris detection algorithm to complete locating the iris coordinates in the iris image, so that the position of the supplementary light source may not be adjusted according to the light spot location information and the iris location information, and that the light spot cannot be moved out of the iris region by adjusting the position of the supplementary light source.

The present disclosure is used to solve the above defect of the prior art. When the iris cannot be located in the first iris image, the case that the light spot completely covers the entire iris region may occur, and the second tripod head needs to be rotated. Specifically, it is determined firstly whether the condition of light-avoiding rotation is satisfied, that is, whether the second tripod head needs to be rotated. If the condition of light-avoiding rotation is satisfied, then the second tripod head is rotated, and the angle or the position of the supplementary light source can be controlled and adjusted via the second tripod head, so that the light spot avoids the iris region. The rotation angle and rotation direction of the second tripod head may be set as required. The iris image is re-captured during or after the rotation of the second tripod head, and the captured iris image may also be used for a subsequent iris identification or a subsequent liveness detection etc.

Figure 8:
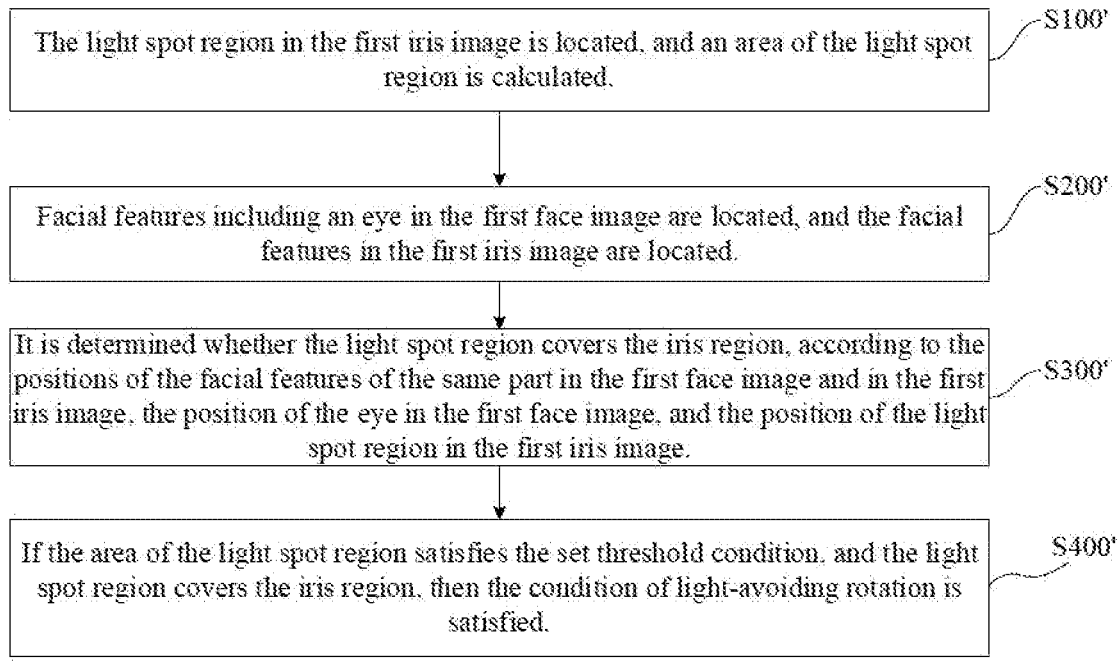
FIG. 8 is a flow chart of the face image and iris image acquisition method according to an embodiment of the present disclosure.

Referring to FIG. 8, The determining whether the condition of light-avoiding rotation is satisfied includes following steps shown in FIG. 8.

At step S100', the light spot region in the first iris image is located, and an area of the light spot region is calculated.

At this step, the light spot region may be located by making a statistic for gray values of pixels in the first iris image. The light spot region is relatively bright, and the gray values thereof are relatively large, therefore the light spot region may be located by making the statistic for the gray values of the pixels in the first iris image.

In addition, the area of the light spot region may also be calculated by the number of the pixels in the light spot region, and it is further determined whether the area of the light spot region meets a set threshold condition. The set threshold condition is generally that the area of the light spot region is greater than half of the area of the iris (generally, the area of the iris is 1 $cm^2$).

At step S200', facial features including an eye in the first face image are located, and the facial features in the first iris image are located.

Since the iris image is an image of part of the face (including both eyes and part of a surrounding region thereof), and the iris image is a near-infrared black and white image, and the face image is a color image of the entire face. Therefore, the color image of the face naturally has more facial features (i.e., feature information points such as nose, lips, eyebrows, eyes, and face, etc.) than the black and white image of the iris. Moreover, a horizontal distance between the face lens and the iris lens on the device is relatively small, and both the face lens and the iris lens capture the face image and the iris image respectively at the same time, therefore, the face image and the iris image of the same user at the same angle and in the same coordinate system are captured. When the iris cannot be located in the iris image, it is possible to locate the eye position in the face image captured at the same angle, which is also a characteristic of the algorithm of locating feature points in the face image.

At step S300', it is determined whether the light spot region covers the iris region, according to the positions of the facial features of the same part in the first face image and in the first iris image, the position of the eye in the first face image, and the position of the light spot region in the first iris image.

The present disclosure adopts two capturing lenses, namely the face lens and the iris lens, both of which simultaneously complete capturing the first face image and the first iris image for the same user at the same distance from the face lens and from the iris lens. Moreover, the field angle of the face lens is greater than the field angle of the iris lens, so the region of the first face image captured by the face lens may completely cover the region of the first iris image captured by the iris lens. A greatest difference between the facial features of the same area in the first face image and in the first iris image exists in the position of the light spot. By calculating a difference between the overlapped region in the first face image and in the first iris image by an algorithm, the position of the light spot may be accurately calculated, and there is no need to worry about that an influence of a too large light spot on locating the iris will disable a next step of avoiding the light spot to be performed.

Specifically, a superposition analysis is performed on the first face image and the first iris image; and the position of the eye in the first iris image may be obtained according to the positions of feature information points of same parts among the located feature information points of facial features such as nose, lips, eyebrows, eyes and faces, etc. in the first face image and the located feature information points of facial features such as nose, lips, eyebrows, eyes and faces etc. in the first iris image, and according to the position of the eye in the first face image. An exact location of the light spot region may be determined by combining with the position of the light spot in the first iris image located and obtained at step S100', thereby determining whether the light spot region covers the iris region.

Figure 15:
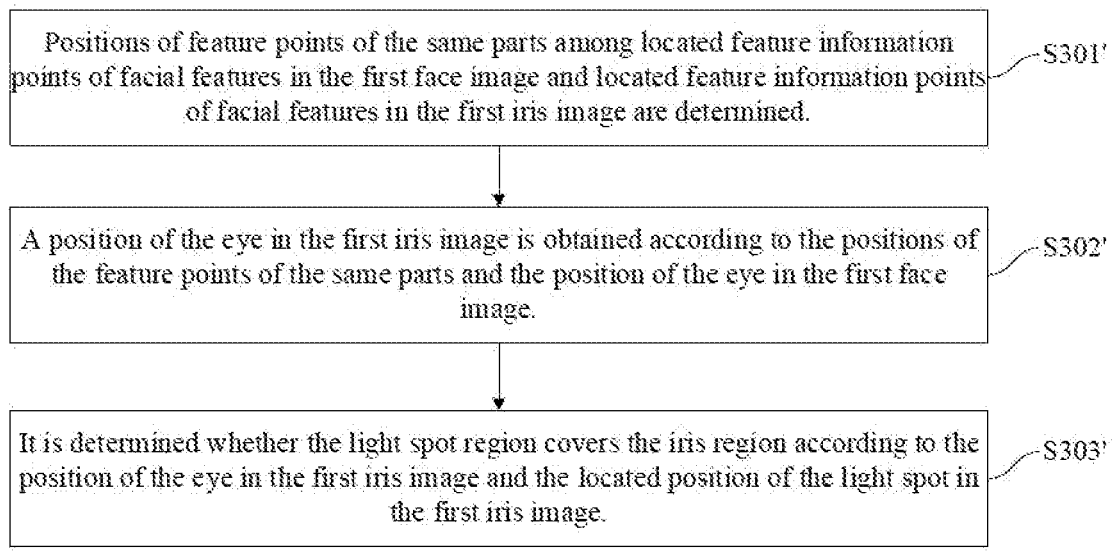
FIG. 15 is a flow chart of the face image and iris image acquisition method according to yet another embodiment of the present disclosure.
Figure 16:
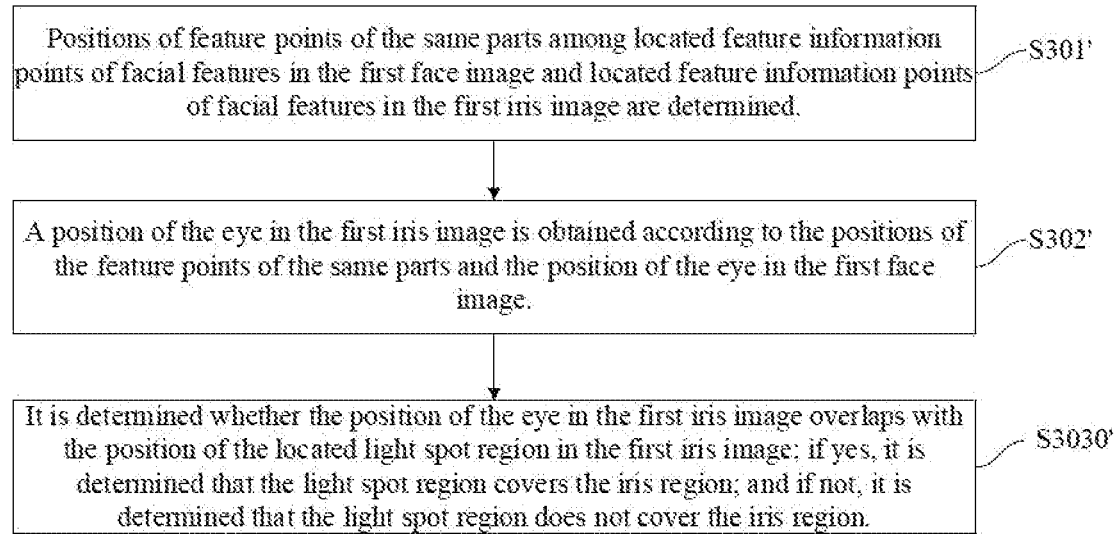
FIG. 16 is a flow chart of the face image and iris image acquisition method according to yet another embodiment of the present disclosure.

Specifically, the Step S300' of determining whether the light spot region covers the iris region according to positions of the facial features of the same part in the first face image and in the first iris image, a position of the eye in the first face image, and a position of the light spot region in the first iris image includes following steps shown in FIG. 15. At step S301', positions of feature points of the same parts among located feature information points of facial features in the first face image and located feature information points of facial features in the first iris image are determined. At step S302', a position of the eye in the first iris image is obtained according to the positions of the feature points of the same parts and the position of the eye in the first face image. At step S303', it is determined whether the light spot region covers the iris region according to the position of the eye in the first iris image and the located position of the light spot in the first iris image. In and embodiment, the step S303' of determining whether the light spot region covers the iris region according to the position of the eye in the first iris image and the located position of the light spot in the first iris image includes step S3030' shown in FIG. 16. At Step S3030', it is determined whether the position of the eye in the first iris image overlaps with the position of the located light spot region in the first iris image; if yes, it is determined that the light spot region covers the iris region; and if not, it is determined that the light spot region does not cover the iris region.

At step S400', if the area of the light spot region satisfies the set threshold condition, and the light spot region covers the iris region, then the condition of light-avoiding rotation is satisfied.

At this step, if the area of the light spot region satisfies the set threshold condition, it means that the light spot is a large light spot, and the area of the light spot is generally greater than half of the area of the iris area, and if the light spot region covers the iris region, then the second tripod head needs to be rotated to adjust the angle and the position of the supplementary light source, so that the light spot avoids the iris region.

The face image and iris image acquisition method of the present disclosure is used to, when the face lens and the iris lens are in the acquisition positions but the iris cannot be located in the first iris image, obtain the area and the position of the light spot in the first iris image, and perform the superposition analysis on the first face image and the first iris image, and determine whether the light spot covers the iris according to the positions of the feature points of the same part of the first face image and the first iris image. If the area of the light spot is greater than the set threshold and the light spot covers the iris, then the angle and the position of the supplementary light source are adjusted so that the light spot avoids the iris region, thereby capturing a clear and usable iris image, and solving the problem in the prior art that the light spot cannot be moved out of the iris region when the iris cannot be located in the iris image.

To sum up, the present disclosure uses the feature points of the same part in the overlapped region of the first face image and the first iris image, and light spot data, thereby avoiding the problem of an iris locating failure caused by the interference of the large light spot. When the light spot covers the iris region, the angle or the position of the supplementary light source is adjusted so that the light spot accurately avoids the iris region, thereby capturing the clear and usable iris image.

During the iris identification, it is needed to capture the user's iris information quickly and accurately, but each person's iris region is relatively small (about 1 cm in diameter), and the iris identification has very high requirements for the clarity and the pixel number of the iris image. Usually, the pixel number captured in the iris region is about 20 pixels/mm, thus causing the field angle of the iris lens not to be too large. At present, most manufacturers use a set of near-infrared light supplement light (for example, a light emitting diode (LED) near-infrared light supplement light) combining with a fixed iris acquisition module to capture the iris image under a condition of a fixed environment and at a fixed height by requiring users to cooperate. For a relatively short user, he/she is needed to stand on tiptoe to make the iris images to be captured better, while for a relatively tall user, he/she is needed to bend over to make the iris images to be captured better. As a result, in the process of capturing the iris images, the conventional iris image acquisition device will face the problems that the iris lens has a small depth of field and cannot automatically adapt to the user's height.

Figure 9:
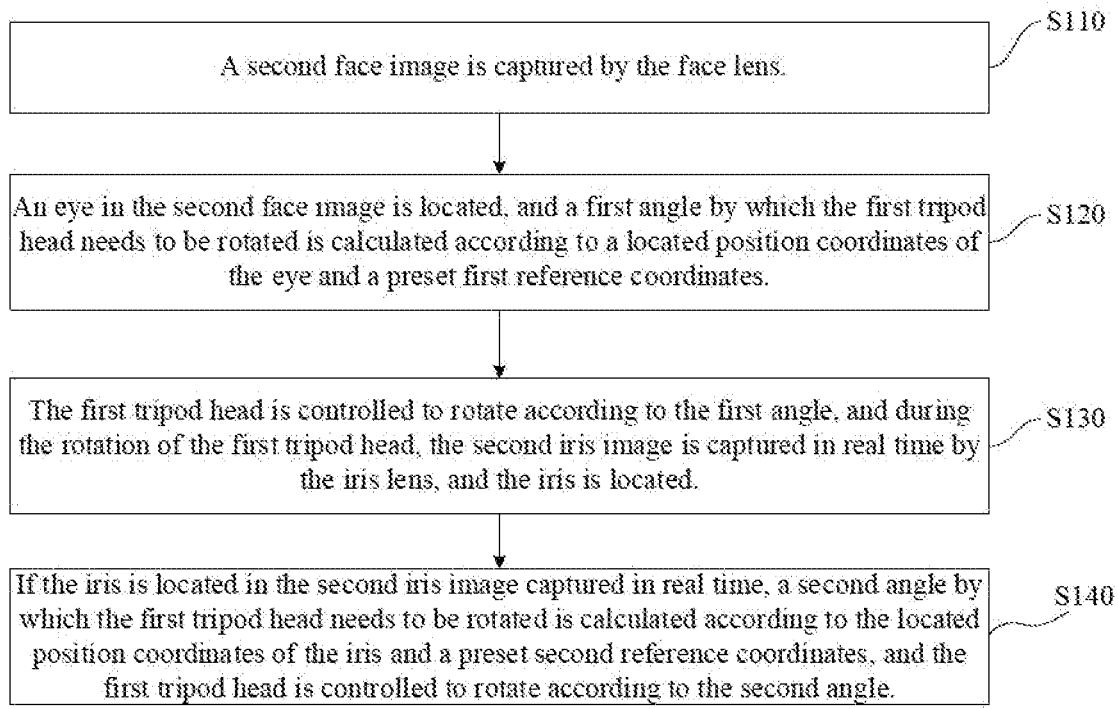
FIG. 9 is a flow chart of the face image and iris image acquisition method according to another embodiment of the present disclosure.

In order to automatically adapt to the iris acquisition for users of different heights, the step S100 in the embodiment of the present disclosure may include following steps shown in FIG. 9.

At step S110, a second face image is captured by the face lens.

The first face image and the second face image are only used to distinguish and name the face images captured for the same user at different times, but do not represent a capturing sequence.

At step S120, an eye in the second face image is located, and a first angle by which the first tripod head needs to be rotated is calculated according to a located position coordinates of the eye and a preset first reference coordinates.

Since the field angle of the face lens is relatively large, it is easier to detect the eye through the face image. Therefore, in the present disclosure, the rotation angle of the first tripod head, namely the first angle, is preliminarily calculated according to the eye coordinates in the second face image at first.

Figures 18, 19:
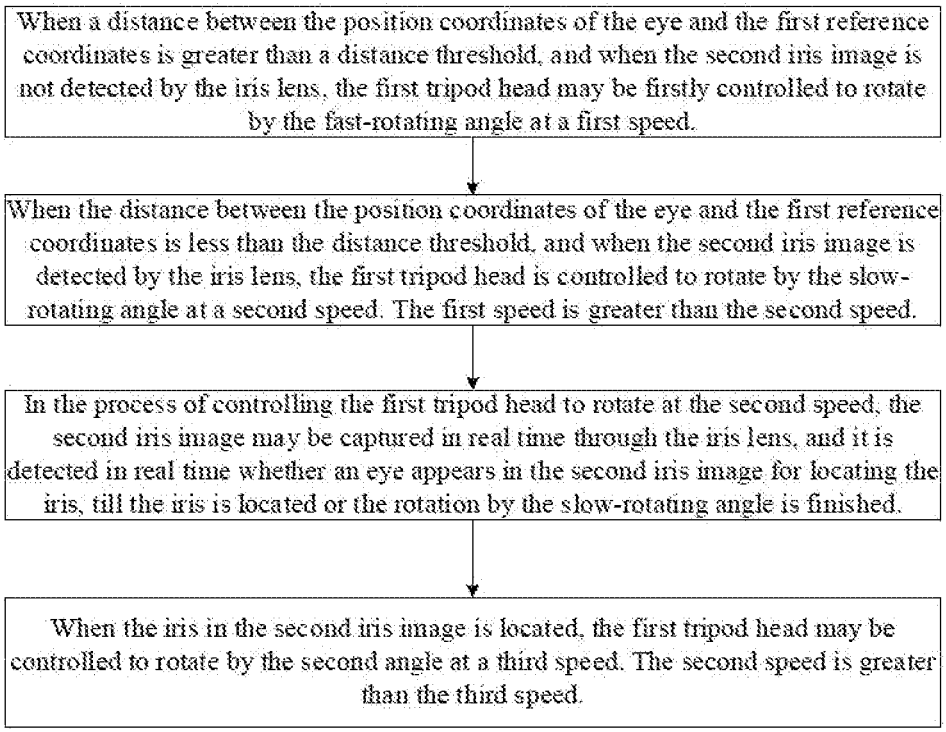
FIG. 18 is a flow chart of the face image and iris image acquisition method according to yet another embodiment of the present disclosure.
FIG. 19 shows a step of the face image and iris image acquisition method according to yet another embodiment of the present disclosure.
Figures 20, 21:
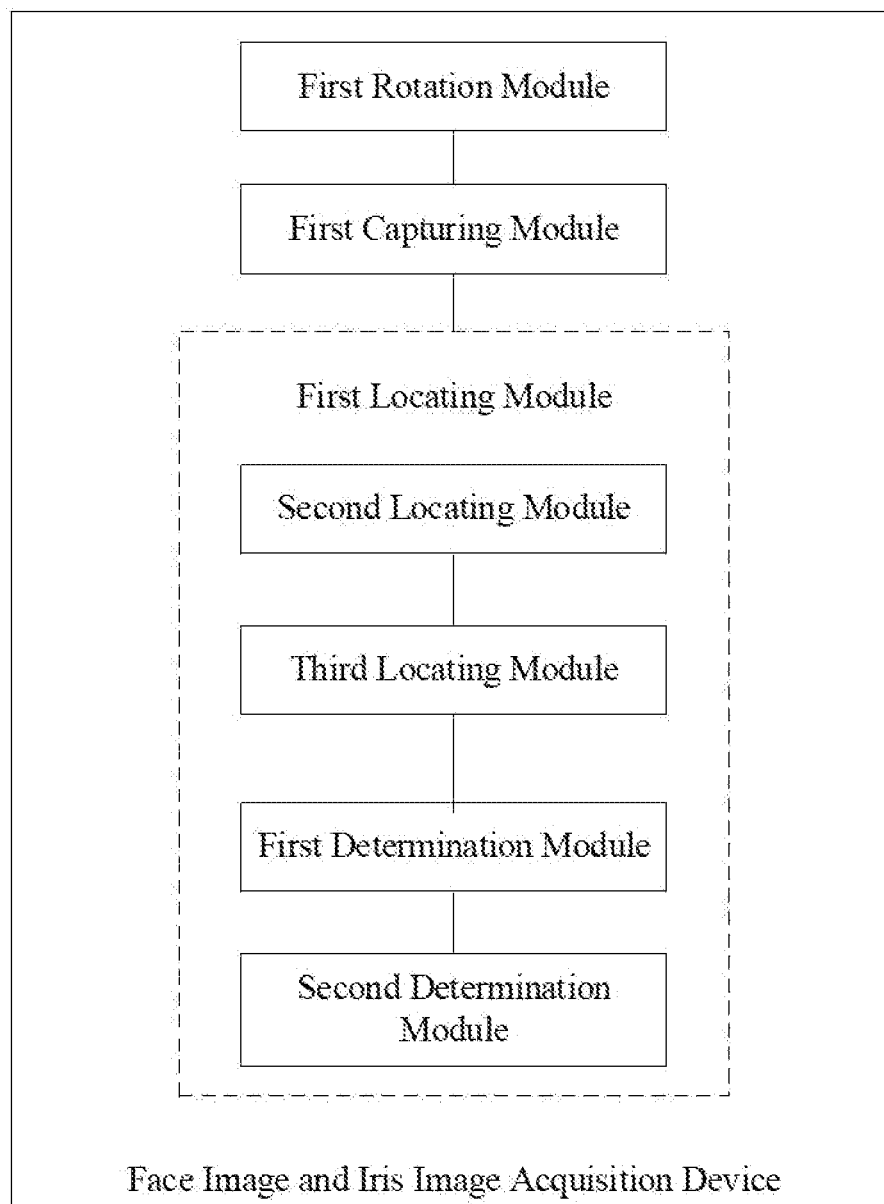
FIG. 20 shows a step of the face image and iris image acquisition method according to yet another embodiment of the present disclosure.
FIG. 21 is a schematic view showing the face image and iris image acquisition device according to an embodiment of the present disclosure.

Specifically, when the first tripod head may perform a two-dimensional rotation, as shown in FIG. 19, step S120 includes following step S1201: a horizontal rotation angle and a vertical rotation angle may be calculated according to a pixel difference between the horizontal and vertical coordinates of the eye position and the reference horizontal and vertical coordinates. When the first tripod head may only rotate up and down or left and right in one dimension (because in most case the present disclosure is adapted to users of different heights, the one-dimensional rotation is generally an up-and-down rotation), as shown in FIG. 20, step S120 includes following step S1202: a horizontal rotation angle or a vertical rotation angle (usually the vertical rotation angle) is calculated according to the pixel difference between the horizontal or vertical coordinate (usually the vertical coordinate) of the eye position and the reference horizontal or vertical coordinate.

At step S130, the first tripod head is controlled to rotate according to the first angle, and during the rotation of the first tripod head, the second iris image is captured in real time by the iris lens, and the iris is located.

At step S140, if the iris is located in the second iris image captured in real time, a second angle by which the first tripod head needs to be rotated is calculated according to the located position coordinates of the iris and a preset second reference coordinates, and the first tripod head is controlled to rotate according to the second angle.

Although the field angle of the iris lens is relatively small, the resolution of the iris lens is relatively high. Therefore, during the rotation, if the iris is detected in the second iris image, the second angle is obtained according to the pixel difference between the position coordinates of the iris in the second iris image and the second reference position coordinates; and the first tripod head is rotated according to the second angle, so that the rotation angle of the first tripod head is more accurate. The specific implementation of obtaining the second angle according to the pixel difference between the position coordinates of the iris in the second iris image and the second reference position coordinates may refer to the above descriptions of obtaining the first angle according to the pixel difference between the position coordinates of the eye in the second iris image and the first reference position coordinates, and will not be repeatedly described hereinafter.

Figure 17:
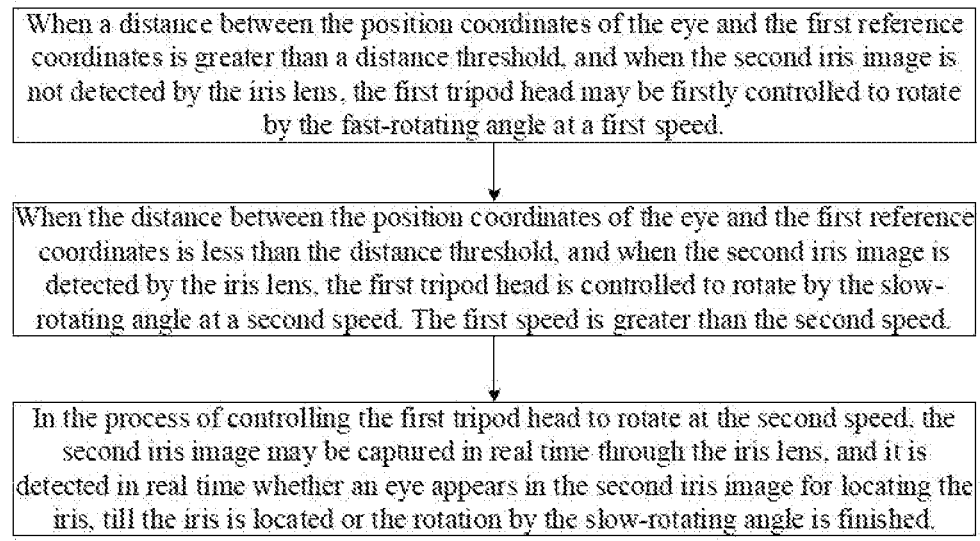
FIG. 17 is a flow chart of the face image and iris image acquisition method according to yet another embodiment of the present disclosure.

The first angle may be divided into a fast-rotating angle and a slow-rotating angle, that is, the first angle is a sum of the fast-rotating angle and the slow-rotating angle. The rotation of the first tripod head being controlled according to the first angle is implemented as follows. Specifically, as shown in FIG. 17, when a distance between the position coordinates of the eye and the first reference coordinates is greater than a distance threshold, and when the second iris image is not detected by the iris lens, the first tripod head may be firstly controlled to rotate by the fast-rotating angle at a first speed. Then, when the distance between the position coordinates of the eye and the first reference coordinates is less than the distance threshold, and when the second iris image is detected by the iris lens, the first tripod head is controlled to rotate by the slow-rotating angle at a second speed. The first speed is greater than the second speed. In the process of controlling the first tripod head to rotate at the second speed, the second iris image may be captured in real time through the iris lens, and it is detected in real time whether an eye appears in the second iris image for locating the iris, till the iris is located or the rotation by the slow-rotating angle is finished.

Therefore, in the process of controlling the first tripod head to rotate by the first angle, the first tripod head rotates by a first section of the first angle at a relatively fast first speed, and the first tripod head rotates by a second section of the first angle at a second speed slower than the first speed.

Through the above means, the first tripod head rotates by the first angle at the relatively fast speed first and then the slow speed. The process of the first tripod head rapidly rotating by the fast-rotating angle may save the rotation time and improve the efficiency of locating the iris. The process of the first tripod head rotating by the slow-rotating angle at the relatively slow speed makes it convenient to stabilize the iris lens to capture the second iris images through the iris lens in real time and to detect whether the eye appears frame by frame, thereby improving the accuracy of the iris locating. Therefore, the efficiency of locating is improved while ensuring the accurate iris locating.

The rotation of the first tripod head being controlled according to the second angle is implemented as follows. Specifically, as shown in FIG. 18, when the iris in the second iris image is located, the first tripod head may be controlled to rotate by the second angle at a third speed. The second speed is greater than the third speed.

During the second rotation of the first tripod head according to the second angle, the rotation speed at this time will be slower and more stable than that of the previous rotation, and operations of capturing the face image and the iris image and judging quality thereof (for example, including determining whether the feature points including the eye are located, and whether the face image and the iris image are blurred, etc.) may be activated at the same time. If it is determined that the quality is qualified, then biologic features will be extracted from the captured face and iris images and be loaded into the memory for preparing for a subsequent comparison process. Therefore, the quality judgment process of the face and iris images may be performed in a relatively stable state, so as to avoid misjudgment that may affect the result of the subsequent comparison process.

A specific example is as follows. In the process of the first tripod head rotating by the first 70% of the first angle, the first tripod head rotates at a high speed of the first speed, and then starts to decelerate when it rotates by the second 30% of the first angle, and rotates at a low speed of the second speed. And then it is determined whether the iris is detected in the second iris images frame by frame by means of the iris lens to locate the iris. During the rotation, once the iris lens finds the iris position information data, the pixel number of the iris coordinates is immediately obtained, and the pixel difference between the iris coordinates and the second reference coordinates are calculated for the second time. The rotation value of the stepper motor is calculated according to the pixel difference, and the first tripod head is controlled to rotate for the second time at a third speed slower than the second speed.

In the present disclosure, firstly, the eye is located (for the first time) based on the second face image captured by the face lens, and the first angle by which the first tripod head needs to be rotated is calculated, and then the first tripod head is controlled to rotate by the first angle, and during the rotation, the iris lens is controlled to capture the second iris image, so that the iris may be located (for the second time) based on the second iris image. Therefore, the first tripod head is rotated by means of combining the eye locating and the iris locating, so that the face lens may quickly locate the eye during the eye locating, and that the iris lens may accurately locate the iris during the iris locating, thereby quickly and accurately achieving an adaptation of the user's height and position.

A specific example (taking the first tripod head rotating up and down as an example) is as follows.

Firstly, the face lens is activated to capture the second face image, and the face area is located to obtain the eye coordinate information. According to the vertical axis data of the eye coordinate position information and the first reference vertical coordinate, the eye pixel difference between the position coordinates of the eye and the first reference position coordinates is calculated and converted into the first rotation value of the stepper motor according to the eye pixel difference. A first rotation instruction is generated according to the first rotation value of the stepper motor, and the first rotation instruction is sent to the motor of the first tripod head. The motor drives the first tripod head to rotate by a corresponding angle according to the first rotation instruction.

Figure 2:
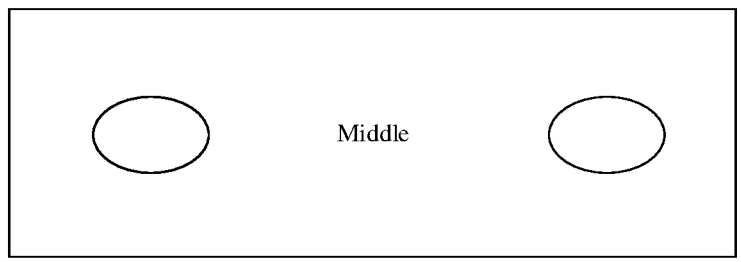
FIG. 2 is a schematic view showing an acquisition position.

During the rotation of the first tripod head driven by the motor, when the iris position information data is detected in the second iris image captured by the iris lens, the pixel number of the iris vertical coordinate is immediately obtained, and the iris pixel difference between the iris vertical coordinate and the second reference vertical coordinate is calculated. The second rotation value of the stepper motor is obtained according to the iris pixel difference, and a second rotation instruction is generated according to the second rotation value of the stepper motor. The second rotation instruction is sent to the motor of the first tripod head, and the motor drives the first tripod head to rotate by a corresponding angle according to the second rotation instruction, so that the iris lens is rotated to an optimum acquisition position, that is, the iris in the second iris image captured at this time is located in a central position, as shown in FIG. 2.

Figure 10:
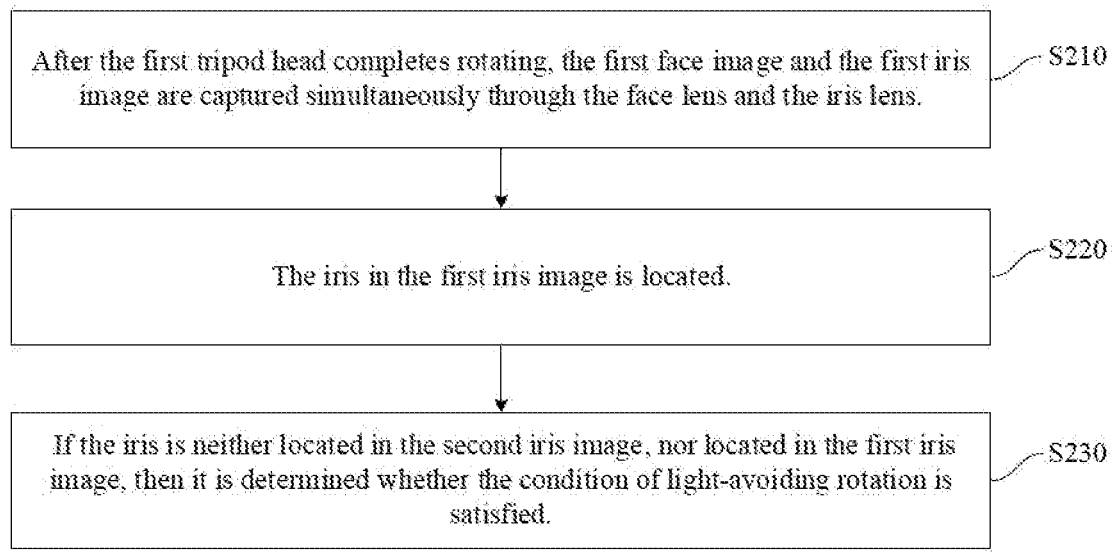
FIG. 10 is a flow chart of the face image and iris image acquisition method according to yet another embodiment of the present disclosure.

The steps S200 and S300 may include following steps shown in FIG. 10.

At step S210, after the first tripod head completes rotating, the first face image and the first iris image are captured simultaneously through the face lens and the iris lens.

At step S220, the iris in the first iris image is located.

At step S230, if the iris is neither located in the second iris image, nor located in the first iris image, then it is determined whether the condition of light-avoiding rotation is satisfied.

That is, the present disclosure firstly ensures that the iris lens and the face lens are controlled to rotate to an expected position matching the height of the user by completing locating the eye for the first time (S120). However, the light spot is too large, therefore, at the step S130, and during the entire rotation process of the iris lens, the iris coordinates cannot be located for the second time in the second iris image, and even after the iris lens completes rotating, the iris cannot be located in the second iris image. At this time, it should be considered and determined whether the second tripod head is rotated to avoid light, that is, it is determined whether the condition of light-avoiding rotation is satisfied, i.e., the steps S100' to S400' are performed.

The iris lens mostly uses a near-infrared active supplementary light source to acquire data, but irises of different race groups have a certain tendency to near-infrared light sources of different wavebands. For example, European and American are more suitable for a light source of 910 nm, and Asian are more suitable for a light source of 810 to 850 nm. If the light source does not match the eye, it will cause some trouble to the iris acquisition, that is, a clear iris image cannot be acquired.

In order to solve the above problem, the supplementary light source of the present disclosure includes a plurality of near-infrared light supplement lights. The plurality of near-infrared light supplement lights are distributed at different positions around the iris lens. The plurality of near-infrared light supplement lights have various wavelengths. When the supplementary light source supplements light, the near-infrared light supplement lights at different positions lighten alternately, and the wavelengths of the near-infrared light supplement lights that lighten simultaneously each time are the same.

In the present disclosure, the near-infrared light supplement lights of various wavelengths are arranged near the iris lens, and the manner of alternate flashing is adopted to make up for the adaptation of various people to the near-infrared light source.

In a specific example, the near-infrared light supplement lights include twelve supplement lights A1, A2, A3, A4, B1, B2, B3, B4, C1, C2, C3, and C4. The wavelengths of the supplement lights A1 to A4 are 810 nm, the wavelengths of the supplement lights B1 to B4 are 850 nm, and the wavelengths of the supplement lights C1 to C4 are 910 nm. The twelve supplement lights are divided into two light supplementing modules, each light supplementing module includes six supplement lights, and the two light supplement modules are arranged symmetrically at the left and right sides of the iris lens.

Figure 3:
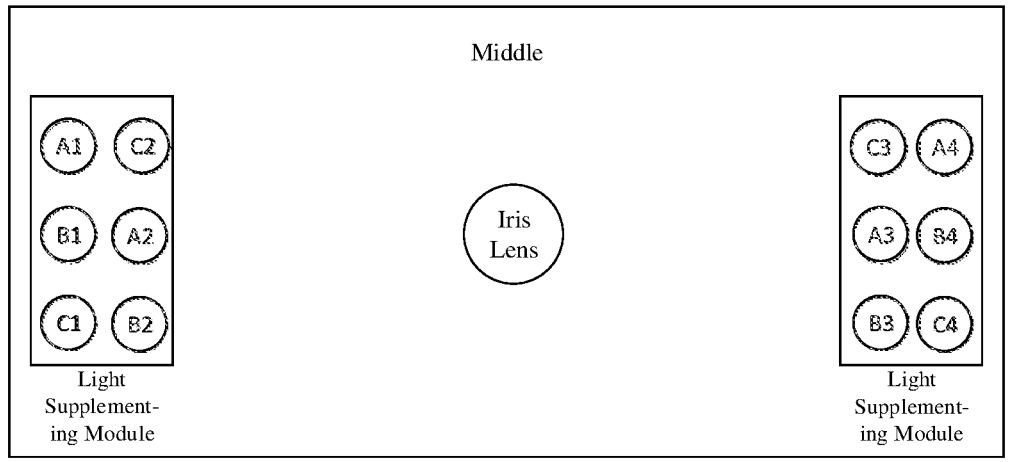
FIGS. 3-5 are schematic views showing light supplement modules located at an upper position, a middle position, and a lower position, respectively.

In the light supplementing module on the left, the supplement light A1 is arranged on the left of a top row, the supplement light C2 is arranged on the right of a top row; the supplement light B1 is arranged on the left of a middle row, and the supplement light A2 is arranged on the right of a middle row; the supplement light C1 is arranged on the left of a bottom row, and the supplement light B2 is arranged on the right of a bottom row. In the light supplementing module on the right, the supplement light C3 is arranged on the left of the top row, the supplement light A4 is on the right of the top row; the supplement light A3 is arranged on the left of the middle row, the supplement light B4 is arranged on the right of the middle row; the supplement light B3 is arranged on the left of the bottom row, and the supplement light C4 is arranged on the right of the bottom row, as shown in FIG. 3.

The twelve supplement lights flash alternately by six groups (A1, A4), (A2, A3), (B1, B4), (B2, B3), (C1, C4), and (C2, C3), each group flashes for 100 to 150 ms. In this way, not only the near-infrared light adaptability of the iris of different race groups is satisfied, but also light may be supplemented from multiple angles to prevent the light spot of glasses, caused by the irradiation of the supplement light, from covering the iris. The plurality of supplement lights are not arranged to form a horizontal line, so as to offset the light spots.

Figure 11:
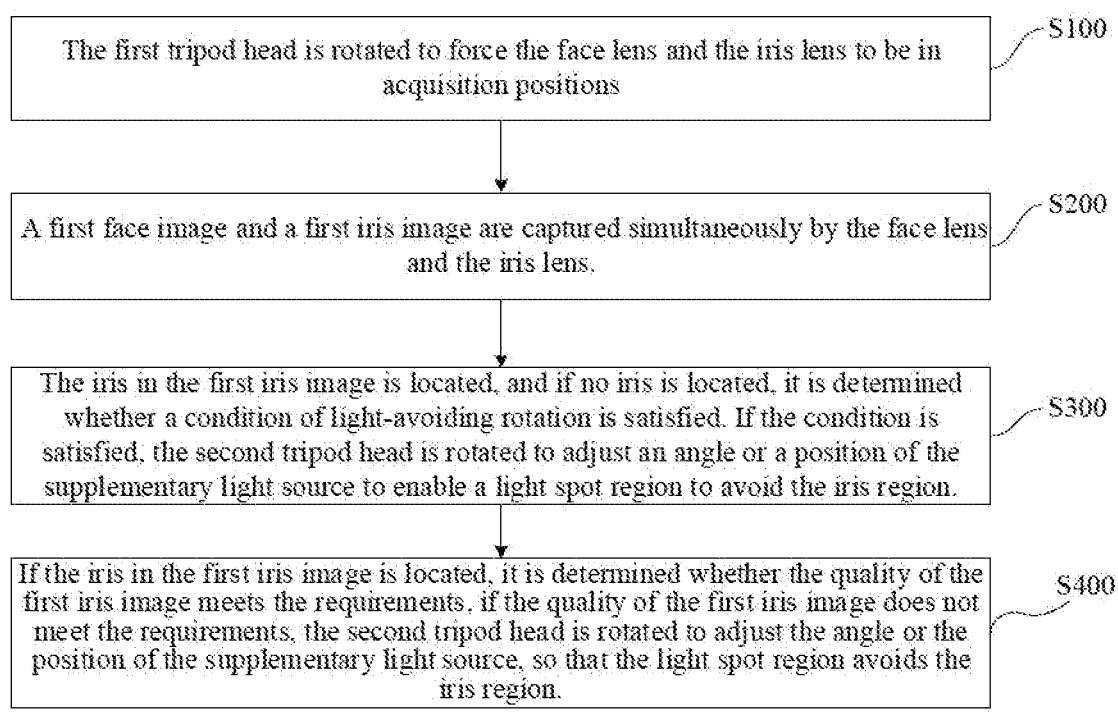
FIG. 11 is a flow chart of the face image and iris image acquisition method according to yet another embodiment of the present disclosure.

The face image and iris image acquisition method provided in the embodiment of the present disclosure may further include the following step shown in FIG. 11.

At step S400, if the iris in the first iris image is located, it is determined whether the quality of the first iris image meets the requirements, if the quality of the first iris image does not meet the requirements, the second tripod head is rotated to adjust the angle or the position of the supplementary light source, so that the light spot region avoids the iris region.

Although the iris lens may avoid the light spot of glasses by alternate flashing of the six groups of lighters, sometimes the iris image may not be successfully captured due to interference of external stray light.

That is to say, at the step S300, if the iris in the first iris image is located, it means that the iris region is not completely covered by the light spot. At this time, it may be determined whether the quality of the first iris image (mainly the clarity of the image, etc.) satisfies the requirements. If the requirements are satisfied, the iris image may be used for liveness detection and identification operations; if the requirements are not satisfied, it means that a clear binocular iris image may not be captured even though the iris is located at an effective acquisition position. In this case, it may be because a small light spot interferes the iris, or because the iris region is covered partially, or because a position of the supplementary light source may be inappropriate, etc., the clear binocular iris image cannot be captured.

In the present disclosure, the supplementary light source is rotated up or down by rotating the second tripod head, and the position of the supplementary light source is adjusted to force the supplementary light source to supplement light for the iris lens from a relatively upper or lower position, so as to eliminate the interference of the light spot.

Figure 4:
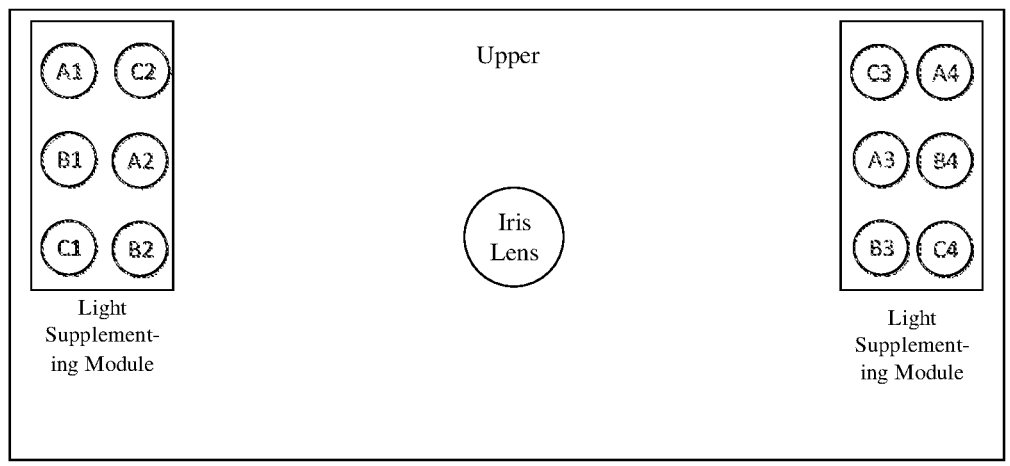
Figure 5:
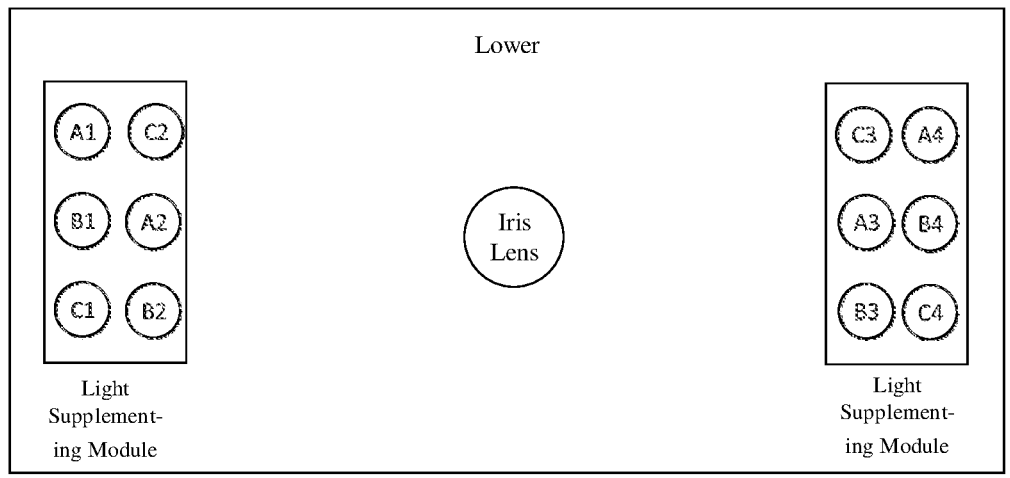

After the iris is located at this step, once a reflection of the lens occurs, the supplementary light source has three positions of the upper, middle and lower positions (shown in FIGS. 3 to 5, in which FIG. 4, FIG. 3, and FIG. 5 show the upper, the middle and the lower positions respectively), and may be automatically adjusted and adapted to quickly avoid the interference of the light spot of the external light source.

Figure 12:
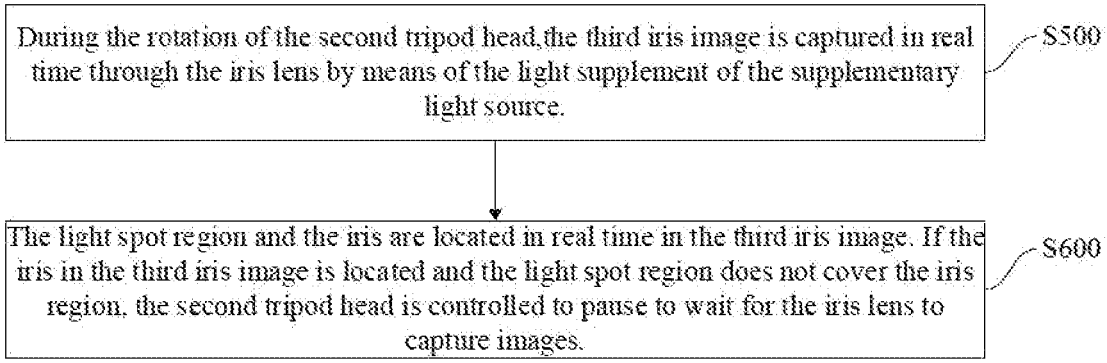
FIG. 12 is a flow chart of the face image and iris image acquisition method according to yet another embodiment of the present disclosure.

The face image and iris image acquisition method provided in the embodiment of the present disclosure may further include the following steps shown in FIG. 12.

At step S500, during the rotation of the second tripod head (including the rotation of the second tripod head at step S400 and step S400'), the third iris image is captured in real time through the iris lens by means of the light supplement of the supplementary light source. While the third iris image is captured, the third face image may be captured at the same time through the face lens.

In the present disclosure, the first iris image, the second iris image, and the third iris image are not named according to an order of capture time but named according to an order of appearance in the text part of the present disclosure. When sorted according to the capture time, the second iris image, the first iris image, and the third iris image are in an order of the capture time. Similarly, when sorted according to an order of capture time, the second face image, the first face image, and the third face image are in an order of the capture time.

At step S600, the light spot region and the iris are located in real time in the third iris image. If the iris in the third iris image is located and the light spot region does not cover the iris region, the second tripod head is controlled to pause to wait for the iris lens to capture images.

The present disclosure may detect the light spot coordinates and the iris coordinates as well through an algorithm. If the light spot coordinates and the iris coordinates coincide, the second tripod head needs to be rotated to drive the light supplementing module to rotate to avoid coinciding. When the second tripod head is rotated till the light spot coordinates are far away from the iris coordinates, the second tripod head pauses appropriately to wait for the iris lens to capture an effective iris image for the subsequent identification and the liveness detection.

Figure 13:
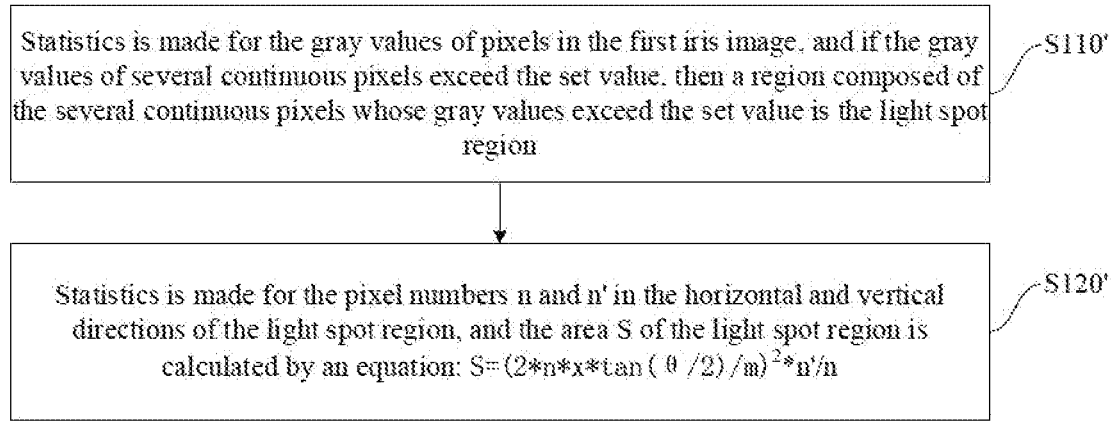
FIG. 13 is a flow chart of the face image and iris image acquisition method according to yet another embodiment of the present disclosure.

The locating the light spot region in the first iris image and calculating the area of the light spot region (step S100') includes following steps shown in FIG. 13.

At step S110', statistics is made for the gray values of pixels in the first iris image, and if the gray values of several continuous pixels exceed the set value, then a region composed of the several continuous pixels whose gray values exceed the set value is the light spot region.

According to statistics, the gray values of the light spot are generally greater than 200, and the horizontal pixels of the iris lens (such as the binocular iris lens) are generally 1920 pix and over, so if the gray values of more than ten continuous pixels in the iris image are detected to be over 200, then the multiple pixels each with a gray value exceeding 200 may be further defined as the light spot region.

At step S120', statistics is made for the pixel numbers n and n' in the horizontal and vertical directions of the light spot region, and the area S of the light spot region is calculated by an equation:

$$S=(2*n*x*\tan(\theta/2)/m)^2 *n'/n$$

Where, m denotes the horizontal pixel number of the first iris image, θ denotes the field angle of the iris lens, and x denotes a capturing distance between the iris lens and the user.

The derivation process of the above equation is as follows.

According to the field angle θ of the iris lens and the capturing distance x (cm) between the iris lens and the user, the horizontal length h(cm) of the first iris image may be calculated:

$$h=2*\tan(\theta/2)*x$$

Then the horizontal length y (cm), the vertical length y' (cm) and the area S (cm$^2$) of the light spot may be calculated by the following equations:

$$y=h*n/m=2*\tan(\theta/2)*x*n/m$$

$$y'=y*n'/n=(2*\tan(\theta/2)*x*n/m)*n'/n$$

$$S=y*y'=(2*n*x*\tan(\theta/2)/m)^2*n'/n.$$

Assuming that the horizontal pixel number m of the first iris image is 1920 pix, the field angle θ is 18 degrees, the capturing distance x is 40 cm, and the light spot has 160 horizontal pixels and 160 vertical pixels, and the final calculated light spot area is approximately equal to 1 cm$^2$.

Figure 14:
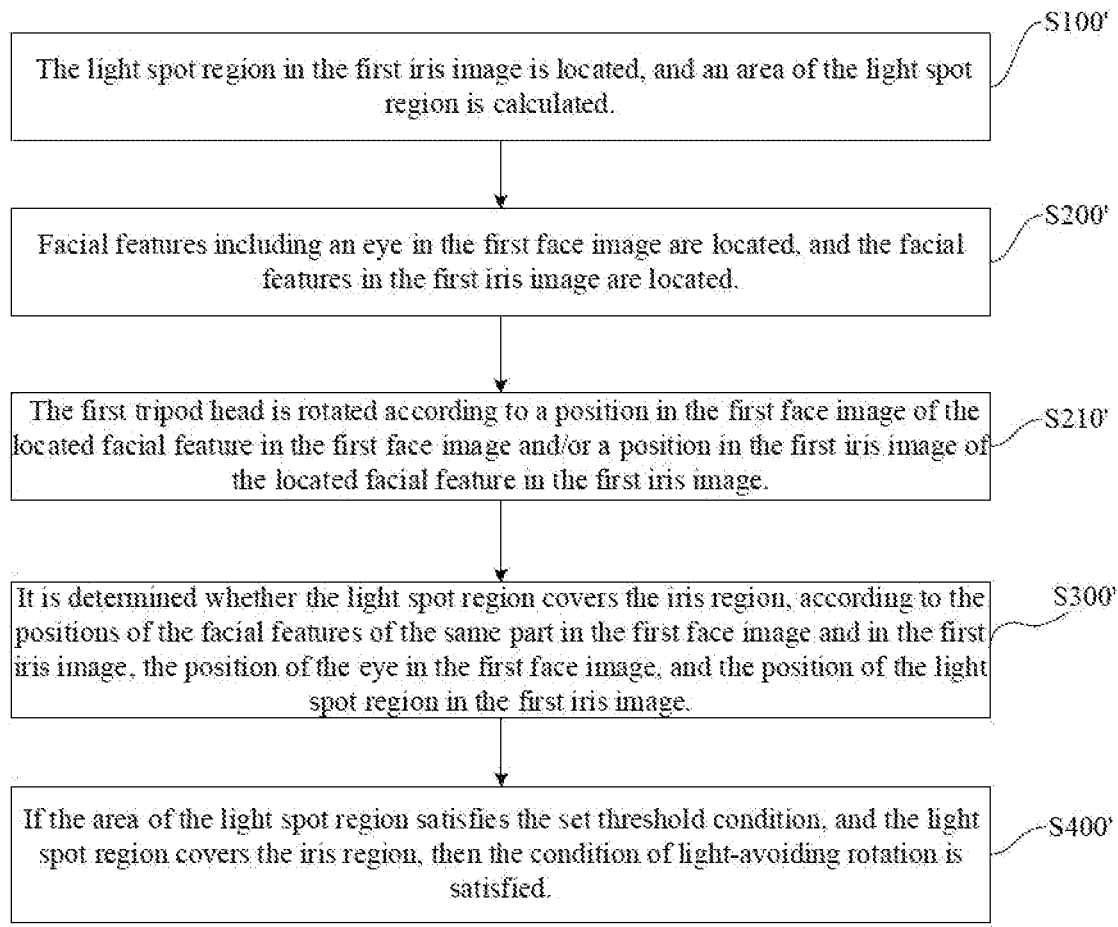
FIG. 14 is a flow chart of the face image and iris image acquisition method according to yet another embodiment of the present disclosure.

After the step S200', the face image and iris image acquisition method provided by the embodiment of the present disclosure may further include the following step shown in FIG. 14.

At step S210', the first tripod head is rotated according to a position in the first face image of the located facial feature in the first face image and/or a position in the first iris image of the located facial feature in the first iris image.

This step is used to verify whether the iris lens and the face lens are really in the preset acquisition position. If eyebrow feature information is found in both images and at a center or lower position thereof, it means that the current acquisition position of the iris lens and the face lens is a little high, and the first tripod head needs to be properly rotated downward. If mouth or nose feature information is found in both images and at an upper position thereof, it means that the current acquisition position of the iris lens and the face lens is a little low, and the first tripod head needs to be rotated upwards appropriately.

After the first tripod head is rotated, and after it is determined that the iris is in the middle area, the subsequent steps proceed, the supplementary light source is adjusted and controlled to rotate up and down by the second tripod head (step $300' to step S400'), to forcibly avoid the interference of the light spot of the external light source.

To sum up, the embodiment of the present disclosure has the following beneficial effects.

1. In the present disclosure, the face lens and the iris lens may be rotated at the same time, and automatically adapt to the users of different heights or the users at different distances by locating twice, thereby capturing the user's face and iris information quickly and accurately without any cooperation from the user.

2. In the present disclosure, the supplement lights of multiple wavelengths are used, and the multiple groups of supplement lights alternately flash, thereby avoiding the problem that the iris information of different race groups does not match the near-infrared light, and adapting to the acquisition of the iris information data of the users of different races.

3. In the present disclosure, by using multiple groups of supplementary light sources at different positions that flash and move up and down, the influence of the light spot produced in the process of the supplementary light source irradiating the glasses is avoided, so that the iris acquisition may be completed automatically and efficiently without any cooperation from the user.

4. The overlapped region and the light spot data captured by the face lens and the iris lens are used to avoid the problem of the iris locating failure caused by the interference of the large light spot.

Second Embodiment

The embodiment of the present disclosure provides a face image and iris image acquisition device, both the face lens and the iris lens are installed on the first tripod head, and the face lens and the iris lens simultaneously capture images in real time, and the supplementary light source is installed on the second tripod head.

Figure 6:
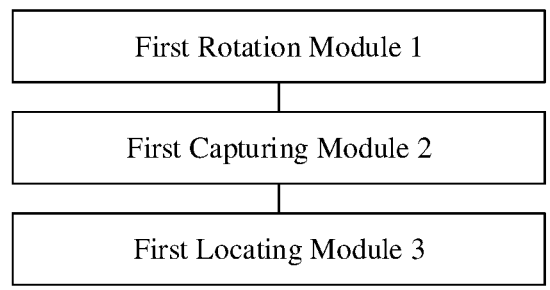
FIG. 6 is a schematic view showing a face image and iris image acquisition device of the present disclosure.

As shown in FIG. 6, the device includes following modules.

A first rotation module 1 is configured to rotate the first tripod head to force the face lens and the iris lens to be in acquisition positions.

A first capturing module 2 is configured to capture the first face image and the first iris image simultaneously by the face lens and the iris lens.

A first locating module 3 is configured to locate the iris in the first iris image, and if no iris is located, to determine whether a condition of light-avoiding rotation is satisfied, and if the condition is satisfied, rotate the second tripod head to adjust an angle or a position of a supplementary light source, to enable a light spot to avoid the iris region.

The determining whether the condition of light-avoiding rotation is satisfied is performed by the following modules shown in FIG. 21.

A second locating module is configured to locate the light spot region in the first iris image, and calculate an area of the light spot region.

A third locating module is configured to locate facial features including an eye in the first face image, and locate the facial features in the first iris image.

A first determination module is configured to determine whether the light spot region covers the iris region, according to the positions of the facial features of the same part in the first face image and in the first iris image, the position of the eye in the first face image, and the position of the light spot region in the first iris image.

A second determination module is configured to determine that the condition of light-avoiding rotation is satisfied if the area of the light spot region satisfies the set threshold condition, and if the light spot region covers the iris region.

The present disclosure uses the feature points of the same part in the overlapped region of the first face image and the first iris image, and light spot data, thereby avoiding the problem of an iris locating failure caused by the interference of the large light spot. The position of the iris can be accurately determined even when the light spot covers the iris, and the angle or the position of the supplementary light source is adjusted so that the light spot accurately avoids the iris region, thereby capturing the clear and usable iris image.

The first rotation module includes following units.

A first capturing unit is configured to capture a second face image by the face lens.

A first locating unit is configured to locate an eye in the second face image, and calculate the first angle by which the first tripod head needs to be rotated according to the located position coordinates of the eye and the preset first reference coordinates.

A first rotation unit is configured to control the first tripod head to rotate according to the first angle, and during the rotation of the first tripod head, capture the second iris image in real time by the iris lens and locate the iris.

A second rotation unit is configured to, if the iris is located in the second iris image captured in real time, calculate the second angle by which the first tripod head needs to be rotated according to the located position coordinates of the iris and the preset second reference coordinates, and control the first tripod head to rotate according to the second angle.

In the present disclosure, the first tripod head is rotated by combining the eye locating (the locating for the first time) and the iris locating (the locating for the second time), and the face lens is used for a quick locating for the first time, and the iris lens is used for an accurate locating for the second time, thereby quickly and accurately achieving the adaptation to the user's height and position.

The first capturing module and the first locating module include following units.

A second capturing unit is configured to, after the first tripod head completes rotating, capture the first face image and the first iris image simultaneously through the face lens and the iris lens.

A second locating unit is configured to locate the iris in the first iris image.

A determining unit is configured to, if the iris is neither located in the second iris image, nor located in the first iris image, determine whether the condition of light-avoiding rotation is satisfied.

The present disclosure firstly ensures that the capturing of the face lens has completed the eye locating for the first time, and that the iris lens and the face lens are rotated to an expected position matching the height of the user. However, the light spot is too large, therefore, during the entire rotation processes of the lenses, the iris coordinates cannot be located for the second time in the iris images, and even after the lens completes rotating, the iris cannot be located in the iris image. At this time, it should be considered and determined whether the second tripod head is rotated to avoid light, that is, it is determined whether the condition of light-avoiding rotation is satisfied.

If the iris in the first iris image is located, it is determined whether the quality of the first iris image meets the requirements, if not, the second tripod head is rotated to adjust the angle or the position of the supplementary light source.

The supplementary light source is rotated up or down by rotating the second tripod head, and the position of the supplementary light source is adjusted to supplement light from a relatively upper or lower position, so as to eliminate the interference of the light spot. It is equivalent that the method simulates an action of holding the glasses up and down by the user to make them at an appropriate angle.

During the rotation of the second tripod head, a third iris image is captured in real time through the iris lens.

The light spot region and the iris are located in real time in the third iris image. If the iris in the third iris image is located and the light spot region does not cover the iris region, the second tripod head is controlled to pause to wait for the iris lens to capture images.

The present disclosure may detect the light spot coordinates and the iris coordinates as well through an algorithm. If the light spot coordinates and the iris coordinates coincide, the light supplementing module needs to be rotated to avoid coinciding. When it is found that the light spot coordinates are far away the iris coordinates, the second tripod head pauses appropriately to wait for the iris lens to capture an effective iris image for the subsequent processes such as the identification and the liveness detection, etc.

The supplementary light source of the present disclosure includes a plurality of near-infrared light supplement lights. The plurality of near-infrared light supplement lights are distributed at different positions around the iris lens. The plurality of near-infrared light supplement lights have various wavelengths. When the supplementary light source supplements light, the near-infrared light supplement lights at different positions lighten alternately, and the wavelengths of the near-infrared light supplement lighters that lighten simultaneously each time are the same.

The second locating module includes following units.

A determination unit for light spot region is configured to make statistics for the gray values of pixels in the first iris image, and if the gray values of several continuous pixels exceed the set value, determine that a region composed of the several continuous pixels is the light spot region.

An area calculation unit is configured to make statistics for pixel numbers n and n' in the horizontal and vertical directions of the light spot region, and calculate an area S of the light spot region by an equation:

$$S=(2*n*x*\tan(\theta/2)/m)^2 *n'/n$$

Where, m denotes the horizontal pixel number of the first iris image, $\theta$ denotes the field angle of the iris lens, and x denotes a capturing distance between the iris lens and the user.

The device further includes a correction unit in addition to the third locating module.

The correction unit is configured to rotate the first tripod head according to a position in the first face image of the located facial feature in the first face image and/or a position in the first iris image of the located facial feature in the first iris image.

To sum up, the embodiment of the present disclosure has the following beneficial effects.

1. In the present disclosure, the face lens and the iris lens may be rotated at the same time, and automatically adapt to the users of different heights or the users at different distances by locating twice, thereby capturing the user's face and iris information quickly and accurately without any cooperation from the user.

2. In the present disclosure, the supplement lights of multiple wavelengths are used, and the multiple groups of supplement lights alternately flash, thereby avoiding the problem that the iris information of different race groups does not match the near-infrared light, and adapting to the acquisition of the iris information data of the users of different races.

3. In the present disclosure, by using multiple groups of supplementary light sources at different positions that flash and move up and down, the process of holding the glasses up and down by the user is simulated, and the influence of the light spot produced in the process of the supplementary light source irradiating the glasses is avoided, so that the iris acquisition may be completed automatically and efficiently without any cooperation from the user.

4. The overlapped region and the light spot data captured by the face lens and the iris lens are used to avoid the problem of the iris locating failure caused by the interference of the large light spot.

The implementation principle and the technical effects of the device provided in the embodiment of the present disclosure are the same as those of the method of the first embodiment. For the sake of a brief description, for parts not mentioned in the embodiment of the device, reference may be made to the corresponding content in the first embodiment of the method above. Those skilled in the art may clearly understand that, for the convenience and brevity of description, the specific operational processes of the device and units described above may be referred to the corresponding processes in the first embodiment of the method above, and will not repeated hereinafter.

Third Embodiment

The method described in the first embodiment provided in the description may realize a business logic through a computer program and be recorded on a storage medium by means of the computer program. The computer program on the storage medium may be read and executed by a computer to achieve the effects of the solutions described in the first embodiment. Therefore, the present disclosure also provides a computer-readable storage medium for face image and iris image acquisition, and the computer-readable storage medium includes a memory for storing processor-executable instructions. The processor, when executing the instructions, performs the steps of the face image and the iris image acquisition method of the first embodiment.

The present disclosure uses the feature points of the same part in the overlapped region of the first face image and the first iris image, and light spot data, thereby avoiding the problem of an iris locating failure caused by the interference of the large light spot. The position of the iris can be accurately determined even when the light spot covers the iris, and the angle or the position of the supplementary light source is adjusted so that the light spot accurately avoids the iris region, thereby capturing the clear and usable iris image.

The storage medium may include a physical device configured to store information, which usually digitizes the information before storing it in a medium by electrical, magnetic or optical means. The storage medium may include: devices that use electrical energy to store information, such as various memories, for example, RAM, ROM, etc.; devices that use magnetic energy to store information, such as hard disks, floppy disks, magnetic tapes, magnetic core memories, magnetic bubbles memory, U disk; devices that store information optically, such as CDs or DVDs. Of course, there are other readable storage media, such as a quantum memory, a graphene memory, and so on.

According to the description of the first embodiment of the method, the above-mentioned device may further have other embodiments. For a specific embodiment, a reference may be made to the description of the related first embodiment of the method, which will not be repeatedly described hereinafter.

Fourth Embodiment

The present disclosure also provides a face image and iris image acquisition apparatus. The apparatus may be a separate computer. Or, the apparatus may include an actual operational device using one or more of the methods, or using one or more of the embodiments of the device described in the description. The face image and iris image acquisition apparatus may include at least one processor and a memory for storing computer-executable instructions. The processor, when executing the instructions, performs the steps of one or more of the face image and the iris image acquisition methods in the first the embodiment. The present disclosure uses the feature points of the same part in the overlapped region of the first face image and the first iris image, and light spot data, thereby avoiding the problem of an iris locating failure caused by the interference of the large light spot. The position of the iris can be accurately determined even when the light spot covers the iris, and the angle or the position of the supplementary light source is adjusted so that the light spot accurately avoids the iris region, thereby capturing the clear and usable iris image.

The above-mentioned apparatus may also have other embodiments according to the description of the embodiment of the method or the embodiment of device. For a specific embodiment, reference may be made to the description of the related first embodiment of the method, which will not be repeatedly described hereinafter. It should be noted that the above-mentioned device or system in the description may also include other embodiments according to the description of the related embodiments of the method. For a specific embodiment, reference may be made to the description of the embodiments of the method, which will not be repeatedly described hereinafter. Each embodiment in this specification is described in a progressive manner, and the same and similar parts between the various embodiments may be referred to each other, and each embodiment focuses on the differences from other embodiments. In particular, for the embodiments of a hardware combining a program, a storage medium combining a program, since they are basically similar to the embodiments of the method, the description thereof is relatively simple. For the relevant parts, please refer to partial description of the embodiments of the method.

The specific embodiments of the present disclosure are described above. Other embodiments are within the scope of the appended claims. In some cases, the actions or steps recited in the claims may be performed in an order different from that in the embodiments and still achieve the desirable effects. Additionally, the processes depicted in the figures do not definitely require the specific order or sequential order as shown to achieve desirable effects. In some embodiments, multitasking and parallel processing are also possible or may be advantageous. The systems, device, modules or units described in the above embodiments may be specifically implemented by a computer chip or an entity, or by a product with certain functions. A typical implementation apparatus is a computer. Specifically, the computer may be, for example, a personal computer, a laptop computer, an in-vehicle human-computer interaction device, a cellular phone, a camera phone, a smart phone, a personal digital assistant, a media player, a navigation device, an email device, a game console, a tablet computer, a wearable device, or any combination of these devices. For the convenience of description, in the description of the above device, the device is divided into various modules and described respectively according to functions. Of course, when one or more embodiments in this specification are implemented, the function of each module may be implemented in the same one software and/or hardware or in more softwares and/or hardwares; alternatively, the modules that implement the same function may also be implemented by a combination of multiple sub-modules or sub-units, etc. The embodiments of the device described above are only illustrative. For example, the division of the units is only a logical function division. In an actual implementation, there may be other division manners. For example, multiple units or components may be combined or integrated into another system, or some features may be ignored, or not implemented. On the other hand, the shown or discussed mutual coupling, or direct coupling, or communication connection, may be indirect coupling or communication connection of devices or units through some interfaces, and may be in electrical, mechanical or other forms. Those skilled in the art also know that, in addition to implementing the controller in the form of pure computer-readable program code, the controller may implement the same function in the form of logic gates, switches, application-specific integrated circuits, programmable logic controllers and embedded devices etc. by logically programming the method steps. Therefore, such controller may be regarded as a hardware component, and the apparatus included in the controller configured to implement various functions may also be regarded as a structure inside the hardware component. Or even, the apparatus configured to implement various functions may be regarded as both a software module implementing a method and a structure within a hardware component. The present disclosure is described with reference to flow charts and/or block diagrams of the methods, apparatus (systems), and computer program products according to embodiments of the present disclosure. It should be understood that each process in the flow charts and/or each block diagram in the block diagrams, and a combination of processes in the flow charts and/or a block diagram in the block diagrams may be implemented by computer program instructions. These computer program instructions may be provided to the processor of a general-purpose computer, a dedicated computer, an embedded processor, or other programmable data processing device to produce a machine, such that the instructions executed by the processor of the computer or other programmable data processing device can produce an apparatus for implementing the functions specified in a process or multiple processes and/or a block diagram or multiple block diagrams. These computer program instructions may also be stored in a computer-readable memory capable of directing a computer or other programmable data processing devices to function in a particular manner, such that the instructions stored in the computer-readable memory produce a manufactured item including the instruction apparatus; the instruction apparatus implements the functions specified in a process or multiple processes and/or a block diagram or multiple block diagrams. These computer program instructions may also be loaded into a computer or other programmable data processing devices to cause a series of operating steps to be performed on the computer or other programmable devices to produce computer-implemented processing, such that the instructions executed on the computer or other programmable devices provide steps for implementing the functions specified in a process or multiple processes and/or a block diagram or multiple block diagrams.

In a typical configuration, a computing device includes one or more central processing units (CPUs), input/output interfaces, network interfaces, and memories.

Each embodiment in the specification is described in a progressive manner, and the same or similar parts between various embodiments may be referred to each other, and each embodiment focuses on the differences from other embodiments. In particular, for the system embodiments, since they are basically similar to the method embodiments, the description is relatively simple, and for related parts, reference may be made to the partial descriptions of the embodiments of the method. In the description, description of reference terms "one embodiment", "some embodiments", "example", "specific example", or "some examples", etc., refers to that specific features, structures, materials or characteristics described in combination with the embodiments or examples are included in at least one embodiment or example in this specification. In this description, schematic expressions of the above terms are not definitely directed to the same embodiments or examples. Furthermore, the particular features, structures, materials or characteristics described may be combined in any appropriate manner in any one or more embodiments or examples. Furthermore, if no conflicts occur, those skilled in the art may combine and incorporate the different embodiments or examples, as well as the features in the different embodiments or examples described in this description.

Finally, it should be noted that the above-mentioned embodiments are merely some specific embodiments of the present disclosure, and are used for illustrating the technical solutions of the present disclosure, rather than limiting them, and the protection scope of the present disclosure is not limited to these embodiments. Although the present disclosure is described in detail with reference to the aforementioned embodiments, those of ordinary skill in the art should understand that: any person skilled in the art may still modify or easily conceive variants of the technical solutions described in the foregoing embodiments, or make equivalent replacements for some of the technical features within the disclosed technical scope of the present disclosure; and these modifications, variants, or replacements do not make the essence of the corresponding technical solutions deviate from the spirit and scope of the technical solutions of the embodiments of the present disclosure, and all fall within the scope of protection of the present disclosure. Therefore, the protection scope of the present disclosure should be subject to the protection scope of the claims.

What is claimed is:

1. A face image and iris image acquisition method, wherein, a face lens and an iris lens are installed on a first tripod head, a supplementary light source is installed on a second tripod head, the method comprising:
   rotating the first tripod head to force the face lens and the iris lens to be in acquisition positions;
   capturing a first face image and a first iris image simultaneously by the face lens and the iris lens; and
   locating an iris in the first iris image, and if no iris is located, determining whether a condition for a supplementary light source rotation is satisfied, and if the condition is satisfied, rotating the second tripod head to adjust an angle or a position of the supplementary light source to enable a light spot region to avoid an iris region;
   wherein, the determining whether the condition for the supplementary light source rotation is satisfied comprises:
   locating the light spot region in the first iris image, and calculating an area of the light spot region;
   locating facial features comprising an eye in the first face image, and locating the facial features in the first iris image;
   determining whether the light spot region covers the iris region according to positions of the facial features of the same part in the first face image and in the first iris image, a position of the eye in the first face image, and a position of the light spot region in the first iris image; and
   determining that the condition for the supplementary light source rotation is satisfied, if the area of the light spot region satisfies a set threshold condition and the light spot region covers the iris region.

2. The face image and iris image acquisition method according to claim 1, wherein, the rotating the first tripod head to force the face lens and the iris lens to be in the acquisition positions comprises:

capturing a second face image by the face lens;
locating an eye in the second face image, and calculating a first angle by which the first tripod head needs to be rotated according to located position coordinates of the eye and preset first reference coordinates;
controlling the first tripod head to rotate according to the first angle, and during a rotation of the first tripod head, capturing a second iris image in real time by the iris lens, and locating the iris;
calculating a second angle by which the first tripod head needs to be rotated according to located position coordinates of the iris and preset second reference coordinates if the iris is located in the second iris image captured in real time, and controlling the first tripod head to rotate according to the second angle.

3. The face image and iris image acquisition method according to claim 2, wherein, the capturing the first face image and the first iris image simultaneously by the face lens and the iris lens, and the locating the iris in the first iris image, and if no iris is located, determining whether the condition for the supplementary light source rotation is satisfied, comprise:
capturing the first face image and the first iris image simultaneously through the face lens and the iris lens after the first tripod head completes rotating;
locating the iris in the first iris image; and
determining whether the condition for the supplementary light source rotation is satisfied, if no iris is located in the second iris image and in the first iris image.

4. The face image and iris image acquisition method according to claim 3, further comprising:
determining whether quality of the first iris image meets requirements if the iris in the first iris image is located, and if the quality of the first iris image does not meet the requirements, rotating the second tripod head to adjust an angle or a position of the supplementary light source.

5. The face image and iris image acquisition method according to claim 1, further comprising:
capturing a third iris image in real time through the iris lens during a rotation of the second tripod head;
locating the light spot region and the iris in real time in the third iris image, and if the iris in the third iris image is located and the light spot region does not cover the iris region, controlling the second tripod head to pause to wait for the iris lens to capture images.

6. The face image and iris image acquisition method according to claim 5, wherein:
the supplementary light source comprises a plurality of near-infrared light supplement lights; and the plurality of near-infrared light supplement lights are distributed at different positions around the iris lens;
when the supplementary light source supplements light, the near-infrared light supplement lights at the same position lighten alternately, and wavelengths of the near-infrared light supplement lights at different positions that lighten simultaneously each time are the same.

7. The face image and iris image acquisition method according to claim 5, wherein, the locating the light spot region in the first iris image, and the calculating the area of the light spot region, comprise:
making statistics for gray values of pixels in the first iris image, and if the gray values of several continuous pixels exceed a set value, determining a region composed of the several continuous pixels to be the light spot region; and
making statistics for pixel numbers n and n' in horizontal and vertical directions of the light spot region, respectively, and calculating the area S of the light spot region by an equation:

$$S=(2*n*x*\tan(\theta/2)m)^2*n'/n$$

wherein, m denotes a horizontal pixel number of the first iris image, θ denotes a field angle of the iris lens, and x denotes a capturing distance between the iris lens and a user.

8. The face image and iris image acquisition method according to claim 1, wherein, after locating the facial features comprising the eye in the first face image and locating the facial features in the first iris image, the method further comprises:
rotating the first tripod head according to a position in the first face image of a located facial feature in the first face image or a position in the first iris image of a located facial feature in the first iris image.

9. The face image and iris image acquisition method according to claim 1, wherein, after locating the facial features comprising the eye in the first face image and locating the facial features in the first iris image, the method further comprises:
rotating the first tripod head according to a position in the first face image of a located facial feature in the first face image and a position in the first iris image of a located facial feature in the first iris image.

10. The face image and iris image acquisition method according to claim 1, wherein, the determining whether the light spot region covers the iris region according to the positions of the facial features of the same part in the first face image and in the first iris image, the position of the eye in the first face image, and the position of the light spot region in the first iris image, comprises:
determining positions of feature points of the same parts among located feature information points of facial features in the first face image and located feature information points of facial features in the first iris image;
obtaining a position of the eye in the first iris image according to the positions of the feature points of the same parts and the position of the eye in the first face image; and
determining whether the light spot region covers the iris region according to the position of the eye in the first iris image and the located position of the light spot in the first iris image.

11. The face image and iris image acquisition method according to claim 10, wherein, the determining whether the light spot region covers the iris region according to the position of the eye in the first iris image and the located position of the light spot in the first iris image, comprises:
determining whether the position of the eye in the first iris image overlaps with the position of the located light spot region in the first iris image; if yes, determining that the light spot region covers the iris region; and if not, determining that the light spot region does not cover the iris region.

12. The face image and iris image acquisition method according to claim 2, wherein:
the first angle is a sum of a fast-rotating angle and a slow-rotating angle; and
the controlling the first tripod head to rotate according to the first angle, and during the rotation of the first tripod head, capturing the second iris image in real time by the iris lens, and locating the iris, comprise:

controlling the first tripod head to rotate by the fast-rotating angle at a first speed, when a distance between the position coordinates of the eye and the first reference coordinates is greater than a distance threshold, and when the second iris image is not detected by the iris lens;

controlling the first tripod head to rotate by the slow-rotating angle at a second speed, when the distance between the position coordinates of the eye and the first reference coordinates is less than the distance threshold, and when the second iris image is detected by the iris lens; wherein the first speed is greater than the second speed; and in a process of controlling the first tripod head to rotate at the second speed, capturing the second iris image in real time through the iris lens and locating the iris, till the iris is located or a rotation by the slow-rotating angle is finished.

13. The face image and iris image acquisition method according to claim 12, wherein:

the controlling the first tripod head to rotate according to the second angle comprises controlling the first tripod head to rotate by a second angle at a third speed when the iris in the second iris image is located; and the second speed is greater than the third speed.

14. The face image and iris image acquisition method according to claim 6, wherein:

the plurality of near-infrared light supplement lights are divided into at least two light supplement modules;

the at least two light supplement modules are arranged symmetrically at left and right sides of the iris lens; and the plurality of near-infrared light supplement lights are not on the same horizontal line.

15. The face image and iris image acquisition method according to claim 6, wherein, the first tripod head is configured to perform a two-dimensional rotation; and the calculating the first angle by which the first tripod head needs to be rotated according to the located position coordinates of the eye and the preset first reference coordinates comprises: calculating a horizontal rotation angle and a vertical rotation angle according to a pixel difference between horizontal and vertical coordinates of an eye position and preset reference horizontal and vertical coordinates.

16. The face image and iris image acquisition method according to claim 6, wherein, the first tripod head is configured to rotate up and down in one dimension; and the calculating a first angle by which the first tripod head needs to be rotated according to located position coordinates of the eye and preset first reference coordinates comprises: calculating a vertical rotation angle according to a pixel difference between a vertical coordinate of an eye position and a preset reference vertical coordinate.

17. The face image and iris image acquisition method according to claim 6, wherein, the first tripod head is configured to rotate left and right in one dimension; and the calculating a first angle by which the first tripod head needs to be rotated according to located position coordinates of the eye and preset first reference coordinates comprises: calculating a horizontal rotation angle according to a pixel difference between a horizontal coordinate of an eye position and a preset reference horizontal coordinate.

18. A non-transitory computer-readable storage medium for face image and iris image acquisition, comprising a memory for storing processor-executable instructions, wherein the processor, when executing the instructions, performs steps of the face image and the iris image acquisition method of claim 1.

19. A face image and iris image acquisition apparatus, comprising:

at least one processor and a memory for storing computer-executable instructions, wherein the processor, when executing the computer-executable instructions, performs the face image and the iris image acquisition method of claim 1.

20. A face image and iris image acquisition device, characterized in that, a face lens and an iris lens are installed on a first tripod head, a supplementary light source is installed on a second tripod head, the face image and iris image acquisition device comprising:

a first rotation module, configured to rotate the first tripod head to force the face lens and the iris lens to be in acquisition positions;

a first capturing module, configured to capture a first face image and a first iris image simultaneously by the face lens and the iris lens; and a first locating module, configured to locate an iris in the first iris image, and to determine whether a condition for a supplementary light source rotation is satisfied if no iris is located, and to rotate the second tripod head to adjust an angle or a position of the supplementary light source to enable a light spot region to avoid an iris region if the condition is satisfied;

wherein, determining whether the condition for the supplementary light source rotation is satisfied is performed by:

a second locating module, configured to locate the light spot region in the first iris image, and calculate an area of the light spot region;

a third locating module, configured to locate facial features comprising an eye in the first face image, and locating the facial features in the first iris image;

a first determination module, configured to determine whether the light spot region covers the iris region according to positions of the facial features of the same part in the first face image and in the first iris image, a position of the eye in the first face image, and a position of the light spot region in the first iris image; and a second determination module, configured to determine that the condition for the supplementary light source rotation is satisfied, if the area of the light spot region satisfies a set threshold condition and the light spot region covers the iris region.

* * * * *